United States Patent
Furukawa et al.

(10) Patent No.: US 7,629,192 B2
(45) Date of Patent: Dec. 8, 2009

(54) PASSIVE ELECTRICALLY TESTABLE ACCELERATION AND VOLTAGE MEASUREMENT DEVICES

(75) Inventors: Toshiharu Furukawa, Essex Junction, VT (US); Mark Charles Hakey, Fairfax, VT (US); Steven John Holmes, Guilderland, NY (US); David Vaclav Horak, Essex Junction, VT (US); Charles William Koburger, III, Delmar, NY (US); Leah Marie Pfeifer Pastel, Essex, VT (US)

(73) Assignee: International Business Machines Corporation, Armonk, NY (US)

( * ) Notice: Subject to any disclaimer, the term of this patent is extended or adjusted under 35 U.S.C. 154(b) by 561 days.

(21) Appl. No.: 11/161,181

(22) Filed: Oct. 13, 2005

(65) Prior Publication Data

US 2007/0085156 A1    Apr. 19, 2007

(51) Int. Cl.
*H01L 21/00* (2006.01)
(52) U.S. Cl. ...................................... 438/50
(58) Field of Classification Search .................. 438/50; 257/417; 977/732
See application file for complete search history.

(56) References Cited

U.S. PATENT DOCUMENTS

| | | | |
|---|---|---|---|
| 3,656,352 A | 4/1972 | Low et al | |
| 4,100,807 A | 7/1978 | Engdahl | |
| 6,130,464 A | 10/2000 | Carr | |
| 6,445,006 B1 | 9/2002 | Brandes et al. | |
| 6,750,775 B2 | 6/2004 | Chan et al. | |
| 2003/0136654 A1* | 7/2003 | Itoigawa et al. | 200/61.48 |
| 2004/0181630 A1* | 9/2004 | Jaiprakash et al. | 711/127 |
| 2004/0187578 A1 | 9/2004 | Malametz et al. | |
| 2004/0239210 A1 | 12/2004 | Pinkerton et al. | |

* cited by examiner

*Primary Examiner*—Ha Tran T Nguyen
*Assistant Examiner*—Shaun Campbell
(74) *Attorney, Agent, or Firm*—Schmeiser, Olsen & Watts; William D. Sabo

(57) ABSTRACT

Acceleration and voltage measurement devices and methods of fabricating acceleration and voltage measurement devices. The acceleration and voltage measurement devices including an electrically conductive plate on a top surface of a first insulating layer; a second insulating layer on a top surface of the conductive plate, the top surface of the plate exposed in an opening in the second insulating layer; conductive nanotubes suspended across the opening, and electrically conductive contacts to the nanotubes.

10 Claims, 22 Drawing Sheets

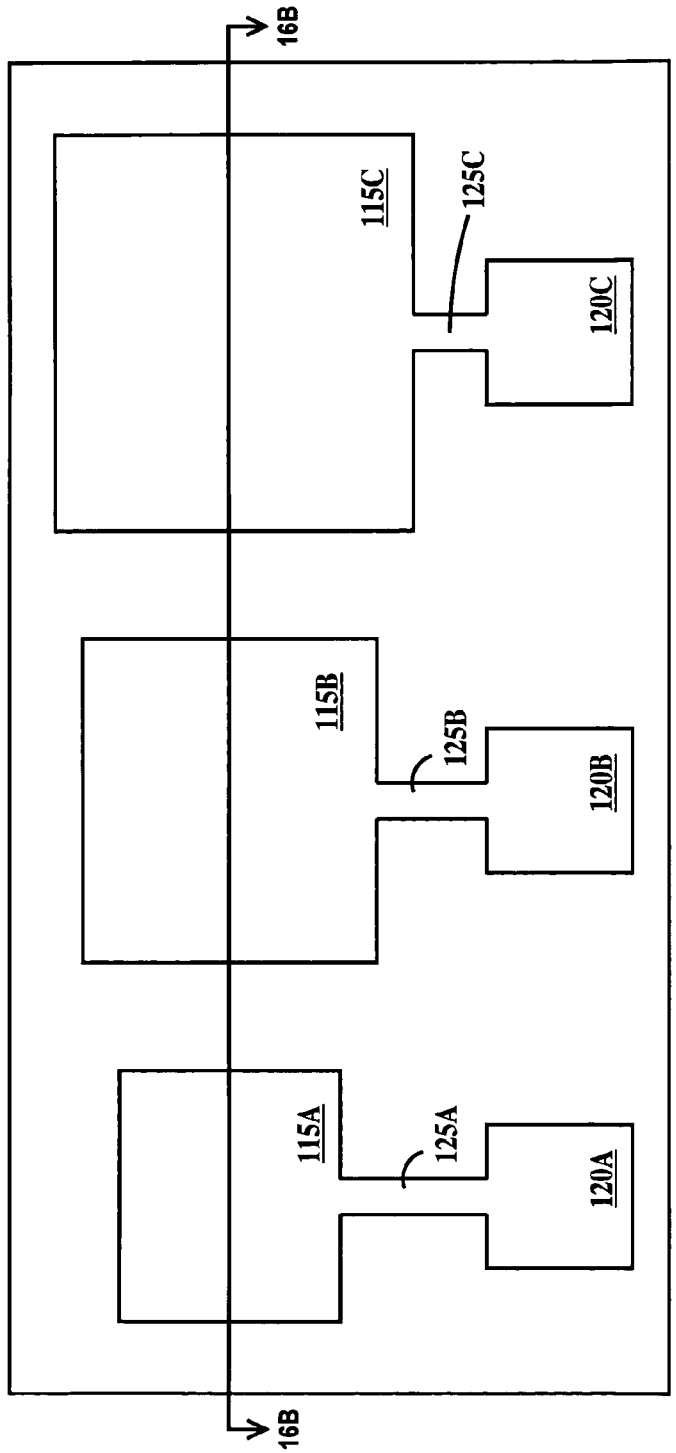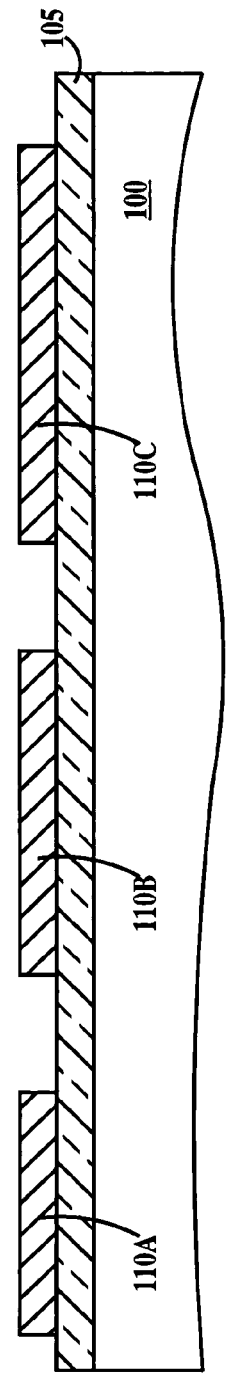
FIG. 16A
FIG. 16B

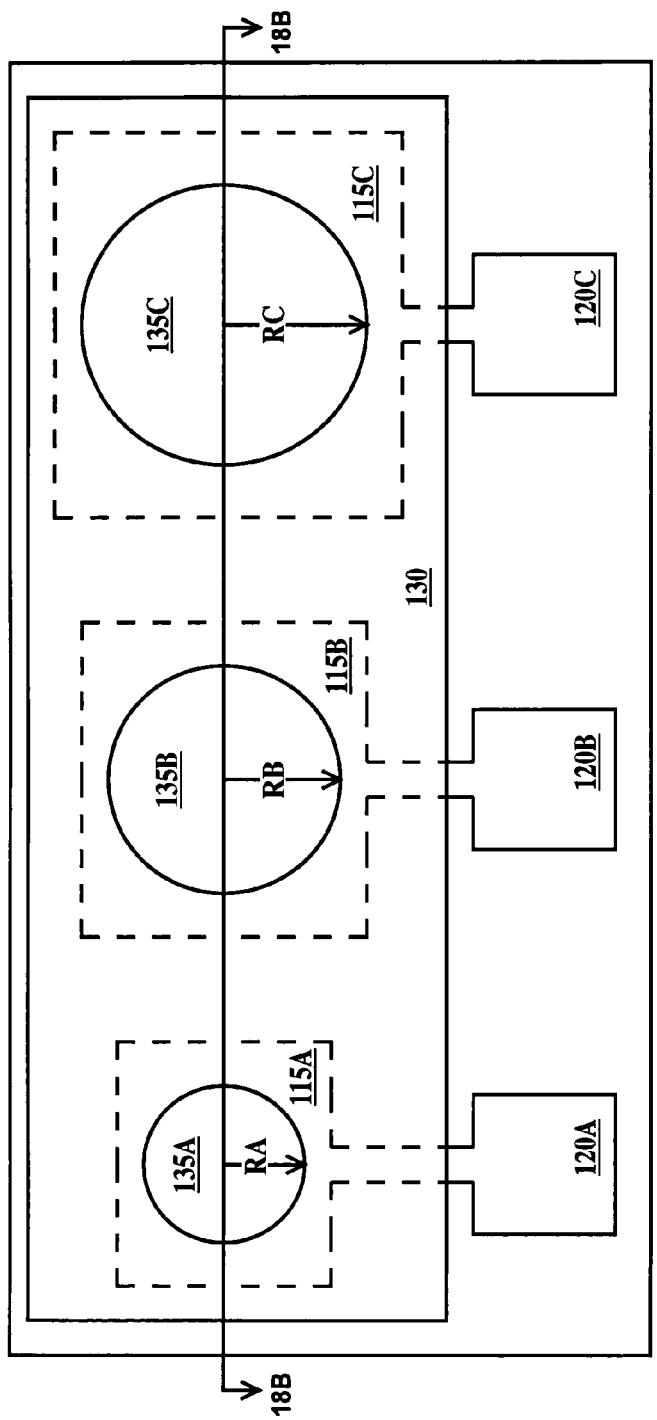
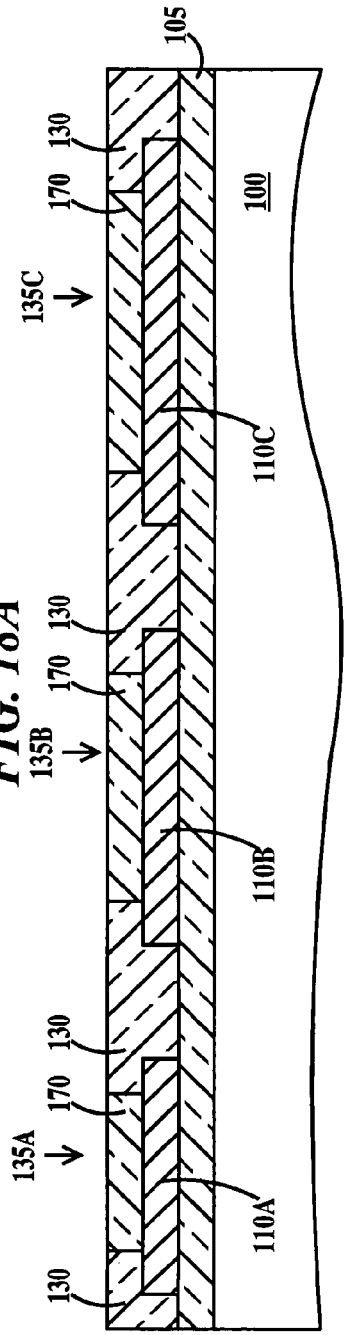
FIG. 18A
FIG. 18B

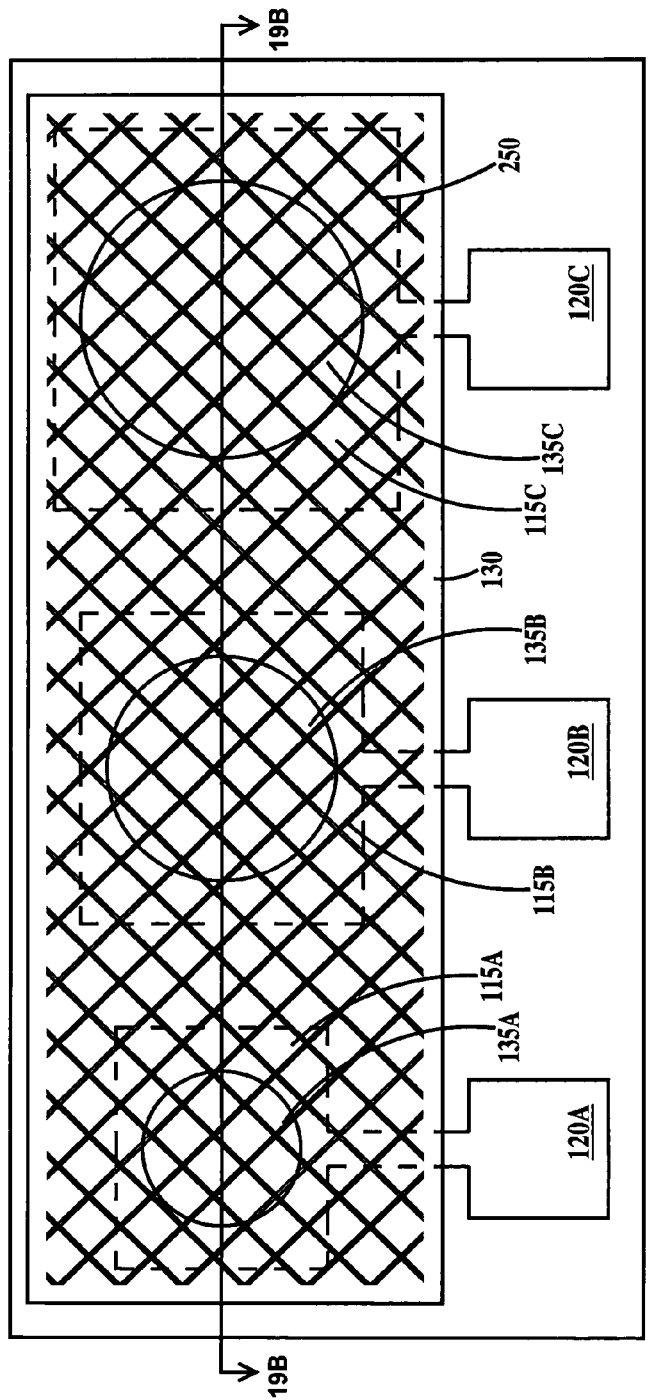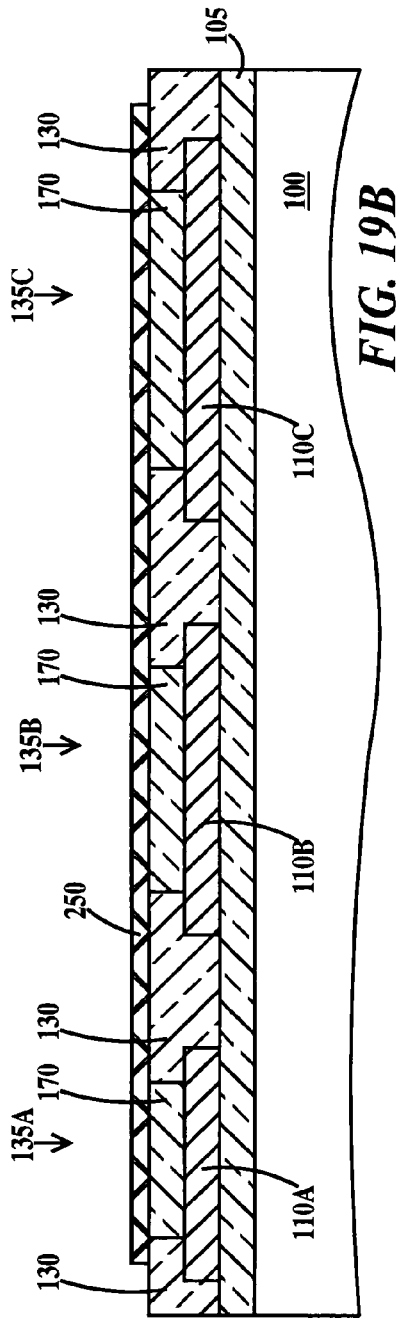
FIG. 19A
FIG. 19B

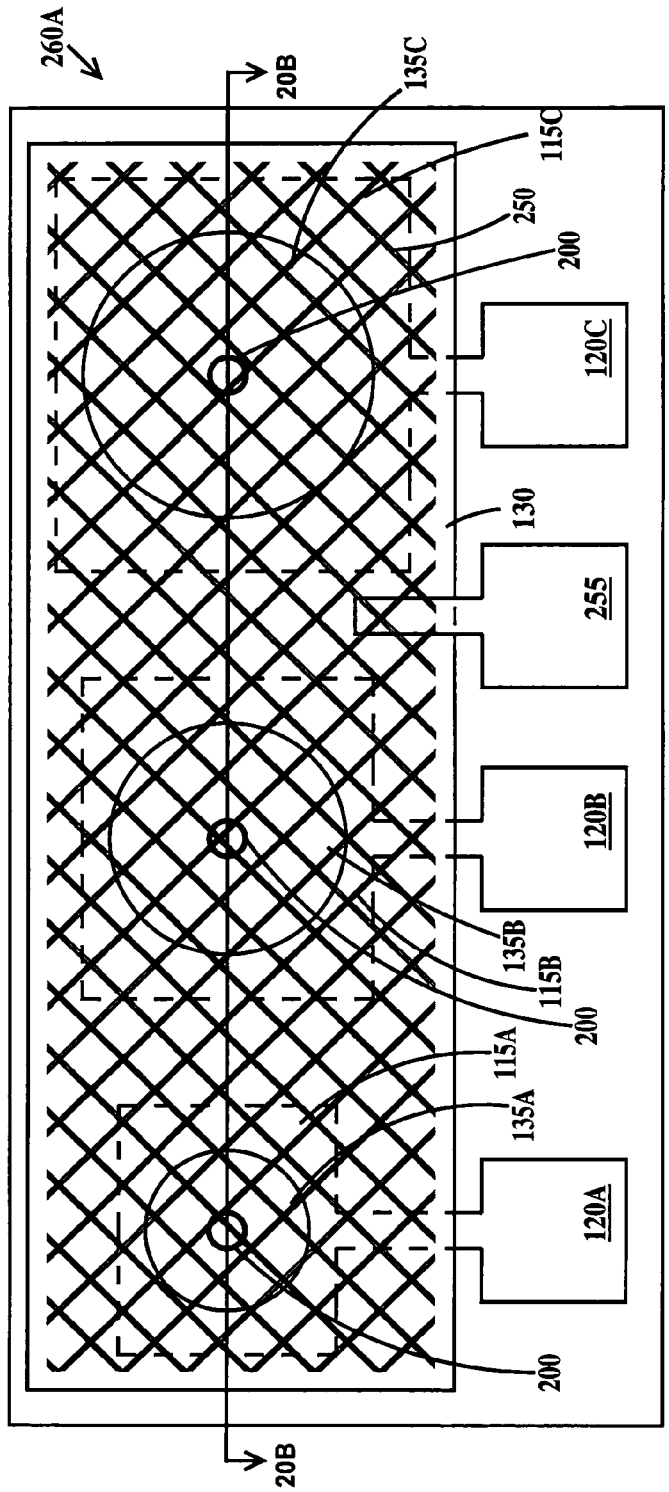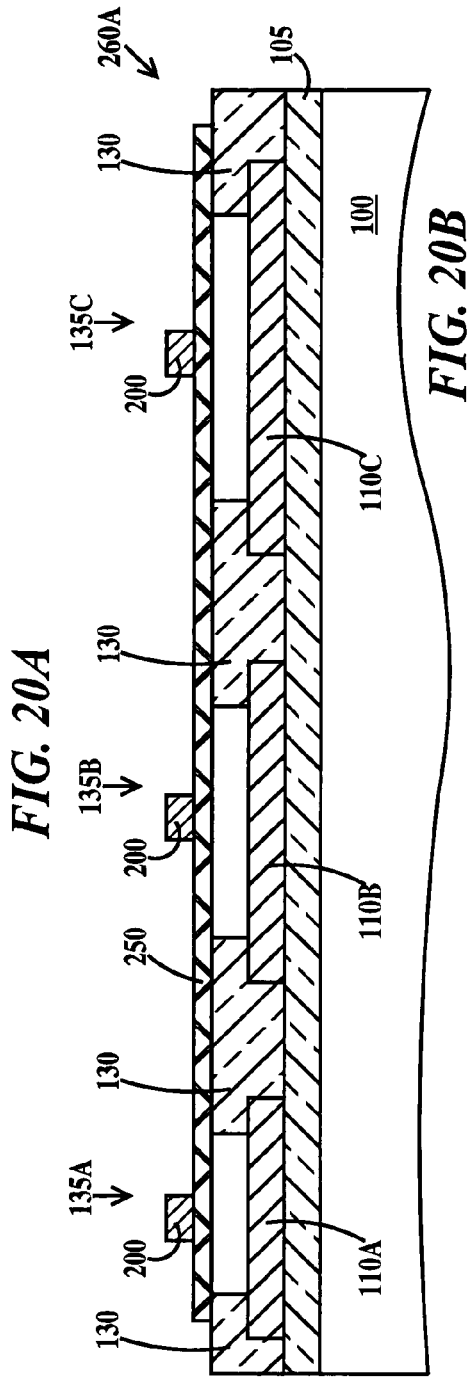

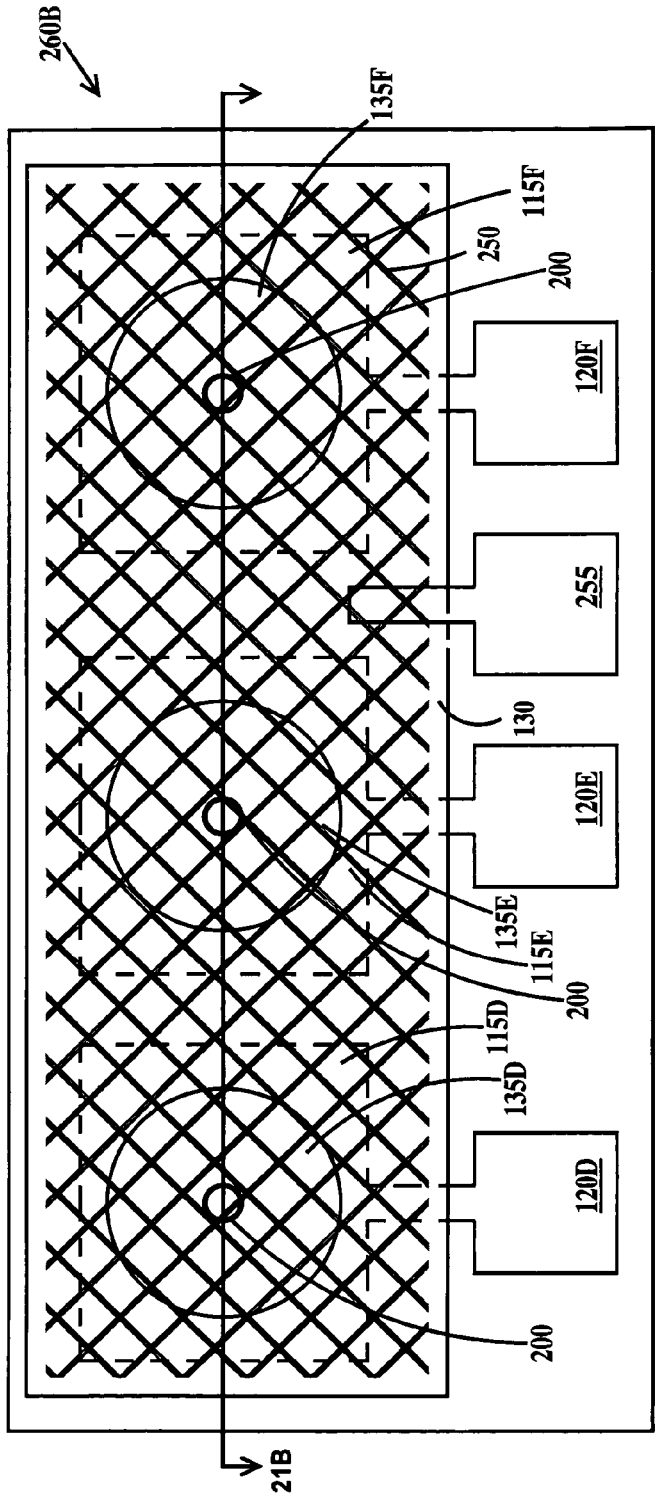
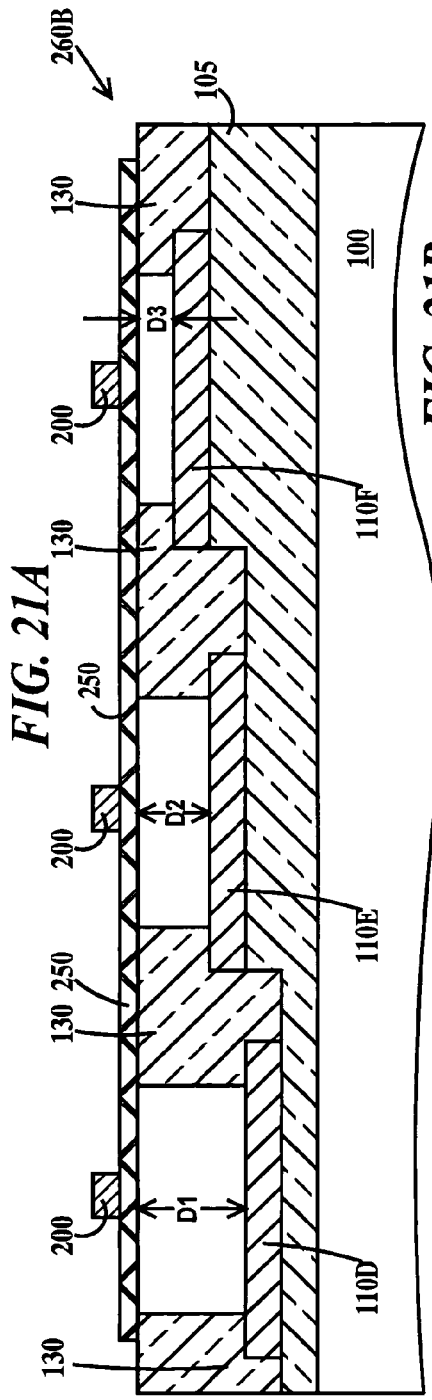
FIG. 21A
FIG. 21B

PASSIVE ELECTRICALLY TESTABLE ACCELERATION AND VOLTAGE MEASUREMENT DEVICES

FIELD OF THE INVENTION

The present invention relates to the field of microelectronic and micro-electromechanical devices comprising carbon nanotubes; more specifically, it relates to micro-accelerometers and voltage measurement devices and methods of making micro-accelerometers and voltage measurement devices.

BACKGROUND OF THE INVENTION

Current methods of measuring and recording acceleration or maximum voltage a device has been subjected to require the acceleration measurement and voltage measurement devices as well as the recording device to be powered during the time period that the acceleration is being measured. In many applications where there is a need to determine if acceleration or exposure to a voltage generating event and how much acceleration occurred or voltage has been induced has occurred, it is impractical or prohibitively expensive to employ acceleration and recording devices that require a constant source of power, particularly over extended periods of time. There are also applications where there is little room to package the required mechanical, electronic and power sources of current acceleration and voltage measurement devices. Therefore, there is a need for a compact and passive maximum acceleration and voltage measurement recording devices.

SUMMARY OF THE INVENTION

A first aspect of the present invention is a device, comprising: an electrically conductive plate on a top surface of a first insulating layer; a second insulating layer on a top surface of the conductive plate, the top surface of the plate exposed in an opening in the second insulating layer; one or more sets of one or more of electrically conductive nanotubes, distal first and second end regions of the nanotubes in contact with the second insulating layer, middle regions of the nanotubes suspended across the opening, nanotubes in different sets of the one or more nanotubes not in electrical contact with each other; and one or more electrically conductive contacts, each of the one or more contacts in electrical contact with first end regions of nanotubes of different sets of the one or more nanotubes.

A second aspect of the present invention is a method comprising: forming an electrically conductive plate on a top surface of a first insulating layer; forming a second insulating layer on a top surface of the conductive plate; forming an opening in the second insulating layer, the top surface of the plate exposed in an opening; forming one or more sets of one or more of electrically conductive nanotubes, distal first and second end regions of the nanotubes in contact with the second insulating layer, middle regions of the nanotubes suspended across the opening, nanotubes in different sets of the one or more nanotubes not in electrical contact with each other; and forming one or more electrically conductive contacts, each of the one or more contacts in electrical contact with first end regions of nanotubes of different sets of the one or more nanotubes.

A third aspect of the present invention is a device, comprising: one or more electrically conductive plates on a top surface of a first insulating layer; a second insulating layer on top surfaces of the conductive plates, the top surfaces of the conductive plates exposed in an opening in the second insulating layer over each of the conductive plates; an electrically conductive mat of nanotubes suspended across the openings; and an electrically conductive contact contacting the mat of nanotubes.

A fourth aspect of the present invention is a method, comprising: forming one or more electrically conductive plates on a top surface of a first insulating layer; forming a second insulating layer on top surfaces of the conductive plates; forming an opening over each conductive plate in the second insulating layer, the top surfaces of the plates exposed in the openings; forming an electrically conductive mat of nanotubes suspended across the openings; and forming an electrically conductive contact to the mat of nanotubes.

BRIEF DESCRIPTION OF DRAWINGS

The features of the invention are set forth in the appended claims. The invention itself, however, will be best understood by reference to the following detailed description of an illustrative embodiment when read in conjunction with the accompanying drawings, wherein:

FIGS. 1A through 8A are top views and FIGS. 1B through 8B are corresponding cross-sectional views illustrating fabrication of an acceleration/voltage measurement device according to a first embodiment of the present invention;

FIGS. 9A through 11A are top views and FIGS. 9B through 11B are corresponding cross-sectional views illustrating addition of optional inertial weights during the fabrication of the acceleration measurement device according to the first embodiment of the present invention;

FIGS. 12A through 14A are a cross-sectional views of the acceleration measurement device according to the first embodiment of the present invention before acceleration and corresponding FIGS. 12B through 14B are a cross-sectional views of the acceleration measurement device according to the first embodiment of the present invention after acceleration;

FIGS. 16A through 20A are top views and FIGS. 16B through 20B are corresponding cross-sectional views illustrating fabrication of an acceleration/voltage measurement device according a third embodiment of the present invention;

FIG. 21A is a top view and FIG. 21B is a cross-sectional view through line 21B-21B of FIG. 21A of an acceleration/voltage measurement device according to a fourth embodiment of the present invention;

DETAILED DESCRIPTION OF THE INVENTION

Carbon nanotubes are more correctly called carbon fullerenes, which are closed-cage molecules composed of $sp^2$-hybridized carbon atoms arranged in hexagons. Carbon nanotubes come in two types of fullerene tubes, single wall fullerenes tubes, which are hollow tube-like structures and multi-wall fullerene tubes. Multi-wall fullerenes resemble sets of concentric cylinders. The present invention utilizes single-wall carbon fullerenes, hereinafter called single-wall nanotubes (SWNT) and multi-wall carbon fullerenes, hereafter called multi-wall nanotubes (MWNT). For the purposes of the present invention, the term carbon nanotube (CNT) denotes either a carbon SWNT or a carbon MWNT. Carbon SWNTs tend to be more flexible than carbon MWNTs.

Figure 1A:
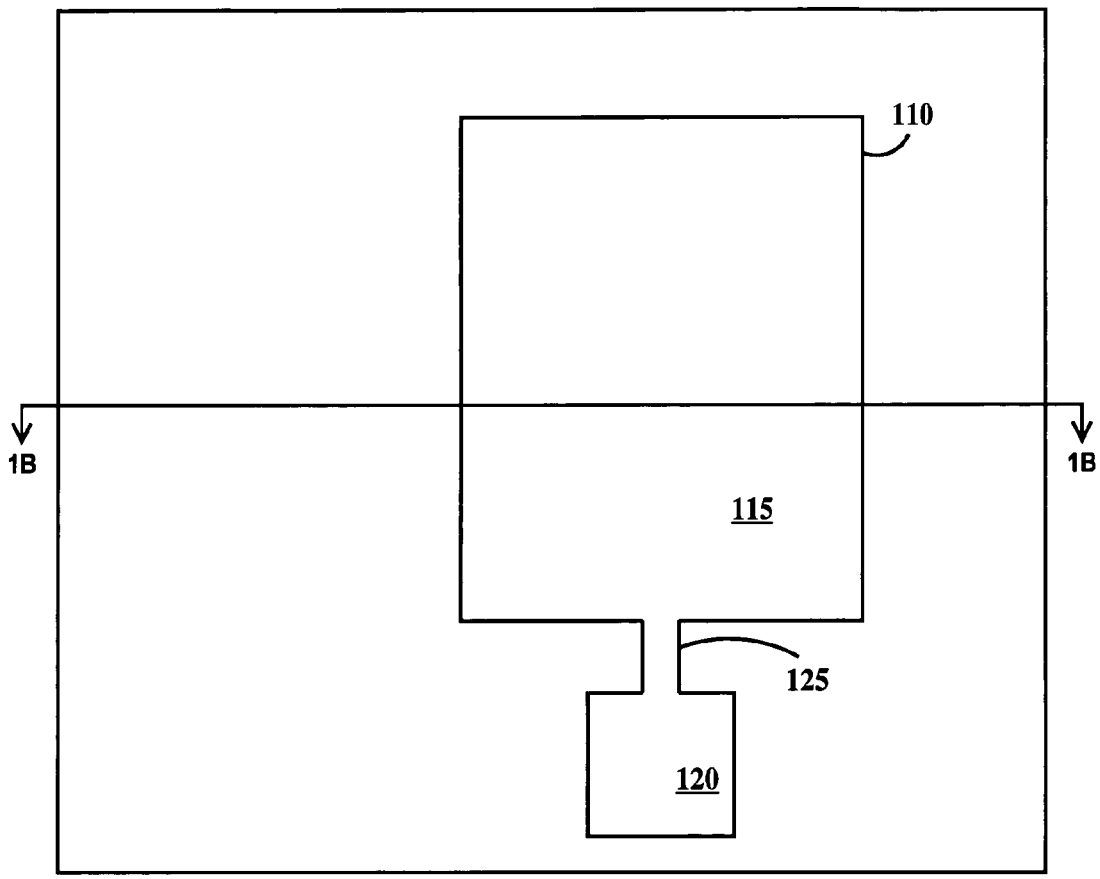
Figure 1B:
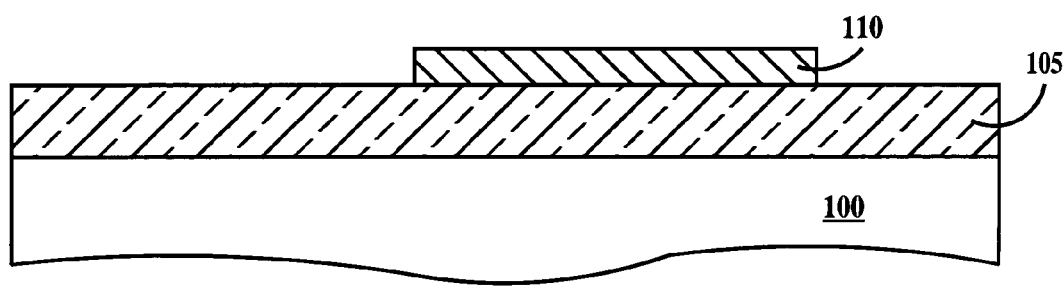

FIGS. 1A through 8A are top views and FIGS. 1B through 8B are corresponding cross-sectional views illustrating fabrication of an acceleration/voltage measurement device according to a first embodiment of the present invention. FIG. 1A is a top view, and FIG. 1B is a cross-sectional view through line 1B-1B of FIG. 1A. In FIGS. 1A and 1B formed on a top surface of a substrate 100 is a first insulating layer 105. Formed on a top surface of insulating layer 105 is a patterned conductive layer 110. Conductive layer 110 includes a plate region 115, a pad region 120 and a connector region 125 between the plate and pad regions. In one example, substrate 100 is a semiconductor substrate, first insulating layer 105 comprises $SiO_2$ and conductive layer 110 comprises doped polysilicon.

In one example, patterned conductive layer 110 is formed by depositing a blanket layer of conductive material, forming a photoresist layer on the blanket layer, lithographically defining a pattern of openings in the photoresist layer to expose the blanket layer, subtractively etching the blanket layer and removing the remaining photoresist.

Figure 2A:
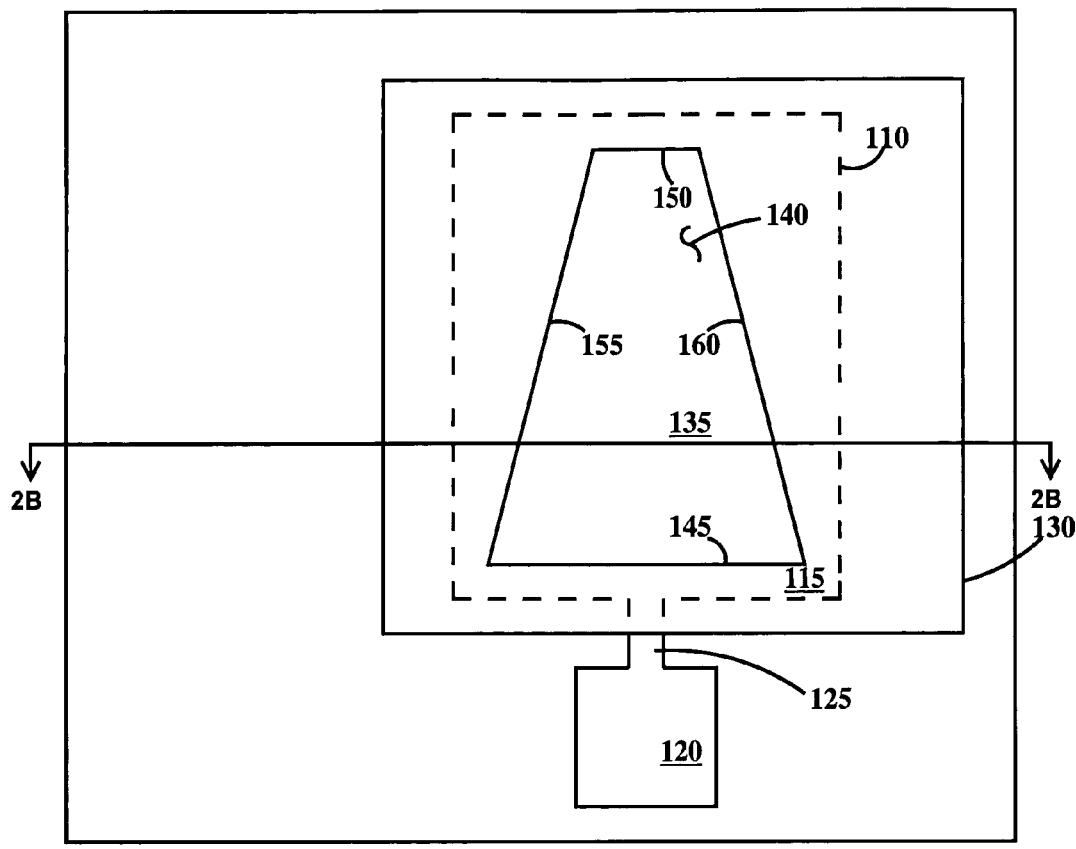
Figure 2C:
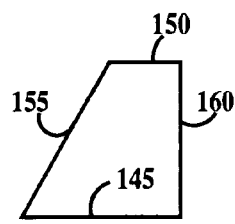
FIG. 2C is a cross-sectional view through line 2C-2C of FIG. 2A.
Figure 2B:
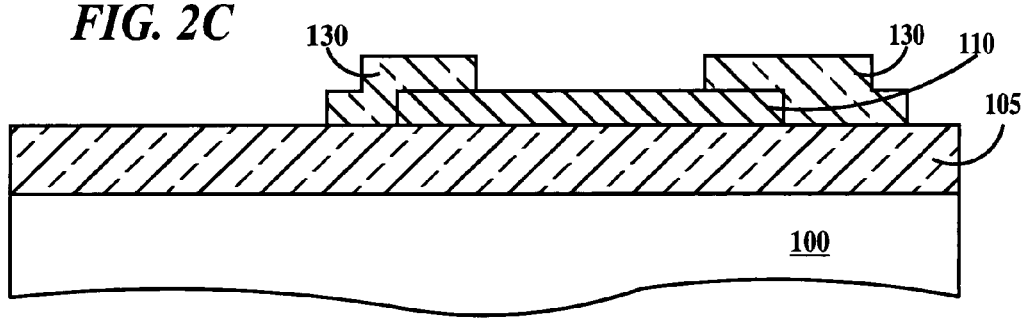

FIG. 2A is a top view, and FIG. 2B is a cross-sectional view through line 2B-2B of FIG. 2A. In FIGS. 2A and 2B a second insulating layer 130 is formed over first insulating layer 105 and overlapping plate region 115 of conductive layer 110. Pad region 120 of conductive layer 110 is not covered by second insulating layer 130. An opening 135 is formed in second insulating layer 130 exposing a top surface 140 of first conductive layer 110 over plate region 115. Opening 135 has four sidewalls 145, 150, 155 and 160 and has a trapezoidal shape. Sidewall 145 and 150 are opposite and parallel to each other connected by sidewalls 155 and 160. Sidewall 150 is shorter than sidewall wall 145. Sidewalls 155 and 160 are of equal length. In a alternative geometry, sidewall 160 is perpendicular to sidewalls 145 and 150 (see FIG. 2C).

In one example, opening 135 in patterned second insulating layer 130 is formed by depositing a blanket layer of layer 130, forming a photoresist layer on the blanket layer, lithographically defining a pattern of openings in the photoresist layer to expose the blanket layer, subtractively etching the blanket layer down to plate region 115 and to first insulating layer 105, and removing the remaining photoresist.

Figure 3A:
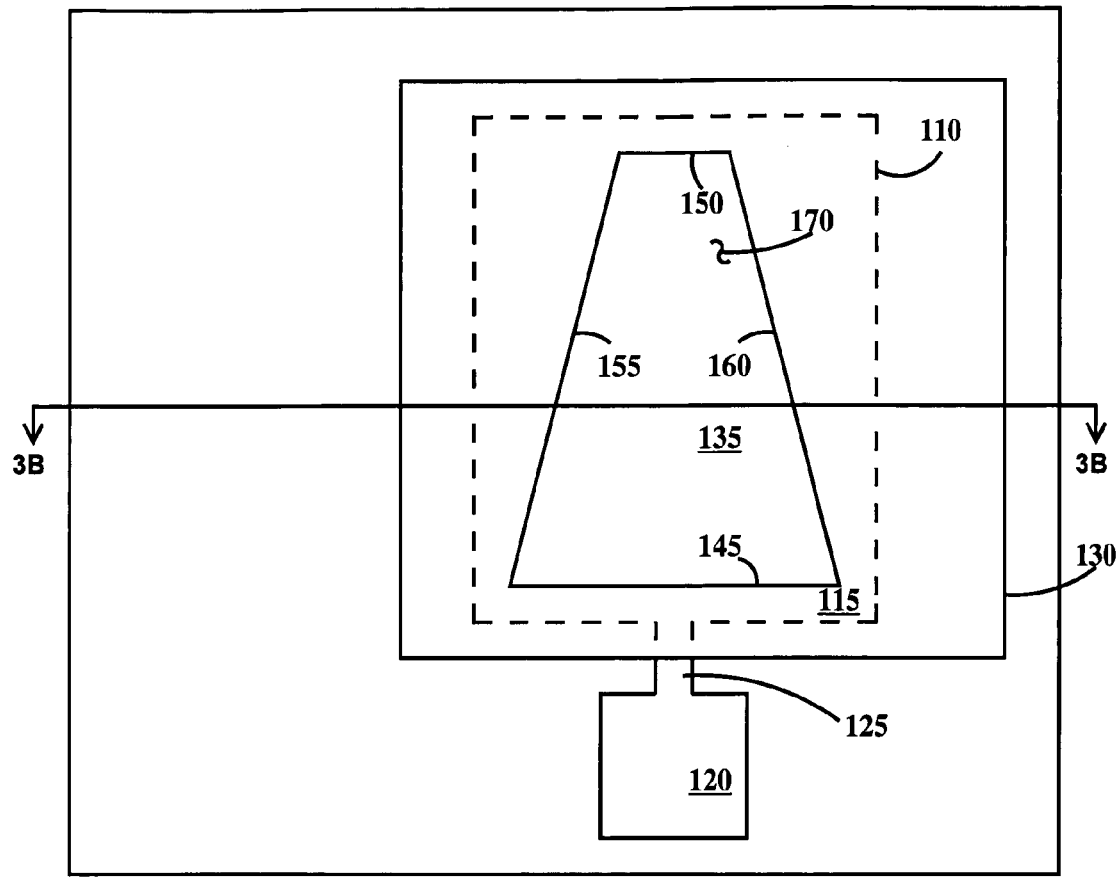
Figure 3B:
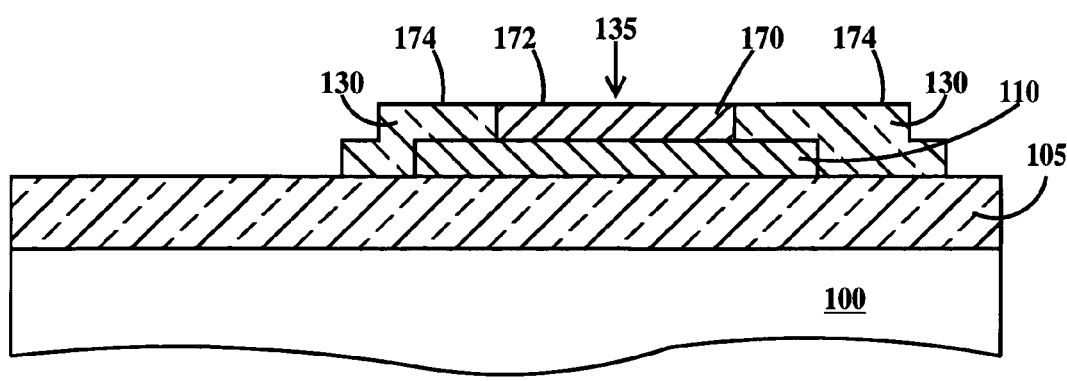

FIG. 3A is a top view, and FIG. 3B is a cross-sectional view through line 3B-3B of FIG. 3A. In FIGS. 3A and 3B opening 135 is filled with a fill material 170. A top surface 172, of fill material 170, being coplanar with a top surface 174 of second insulating layer 130. In one example, fill material is polycrystalline or amorphous germanium.

In one example, opening 135 is filled with fill material by a blanket deposition of fill material followed by a chemical-mechanical polish to remove any fill material above top surfaces 174 of second insulating layer 174. Then any remaining fill material not in opening 135 may be removed by forming a photoresist layer, lithographically defining a pattern of islands in the photoresist layer to protect fill material 170 in opening 135 subtractively etching away exposed fill material and removing the remaining photoresist. When fill material 170 is germanium, a solution of $H_2O_2$ in water may be used as an etchant.

Figure 4A:
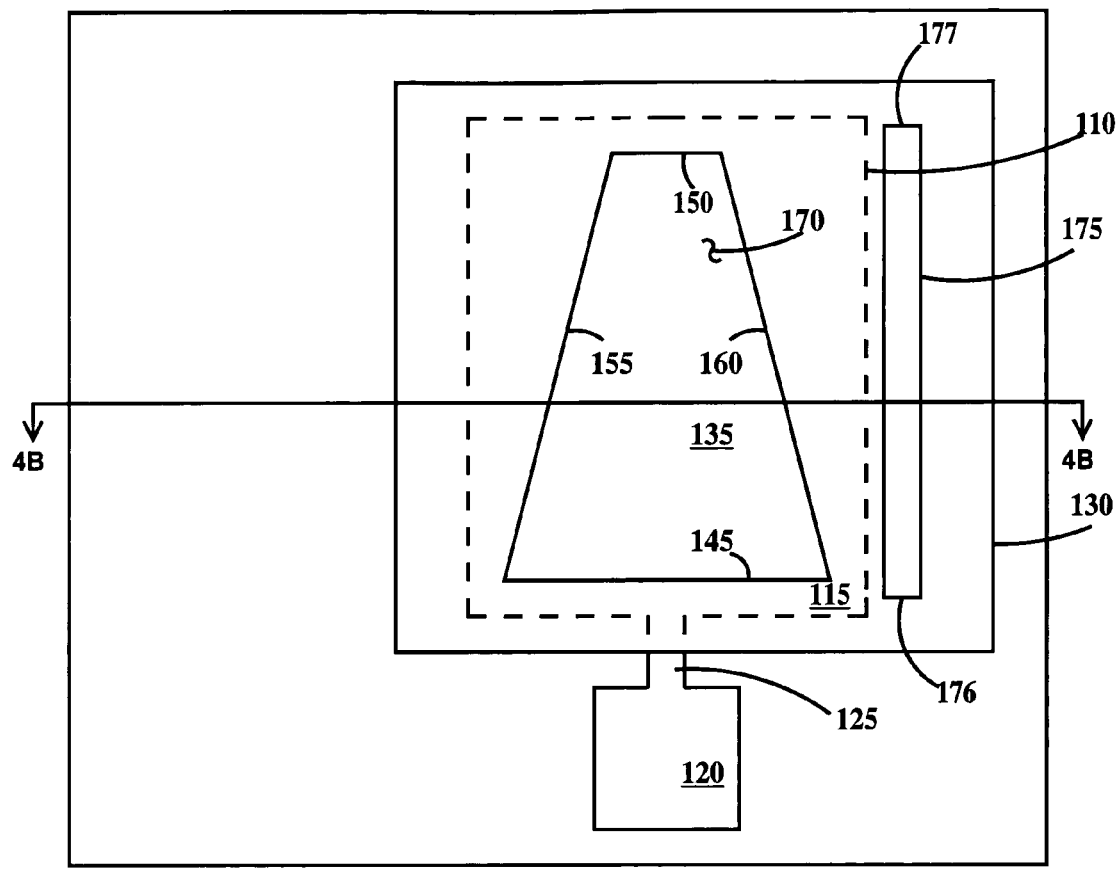
Figure 4B:
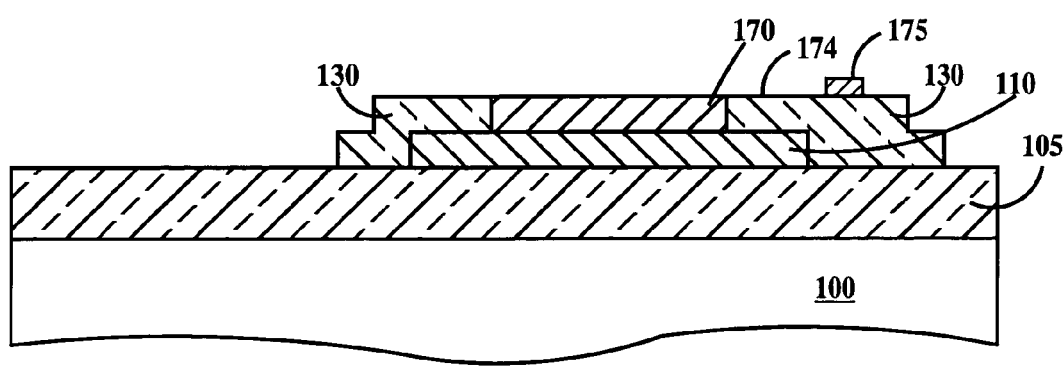

FIG. 4A is a top view, and FIG. 4B is a cross-sectional view through line 4B-4B of FIG. 4A. In FIGS. 4A and 4B a catalytic bar 175 is formed on top surface 174 of second insulating layer 130, adjacent to sidewall 160 of opening 135 and extending in a direction perpendicular to sidewalls 145 and 150. Catalytic bar 175 has opposite ends 176 and 177. Catalytic bar 175 is longer than the perpendicular distance between sidewalls 145 and 150, end 176 extending past sidewall 145 and end 177 extending past sidewall 150. Alternatively, catalytic bar 175 may be shorter than the perpendicular distance between sidewalls 145 and 150 and extend past either or neither of sidewalls 145 and 150. The composition of catalytic bar 175 is described infra.

In one example, catalytic bar 175 is formed using a lift-off process by forming a photoresist layer, lithographically defining a opening in the photoresist layer where catalytic bar 175 is to be formed, depositing a blanket layer of catalytic bar material and then removing the photoresist layer and any catalytic bar material on top of the photoresist layer.

Figure 5A:
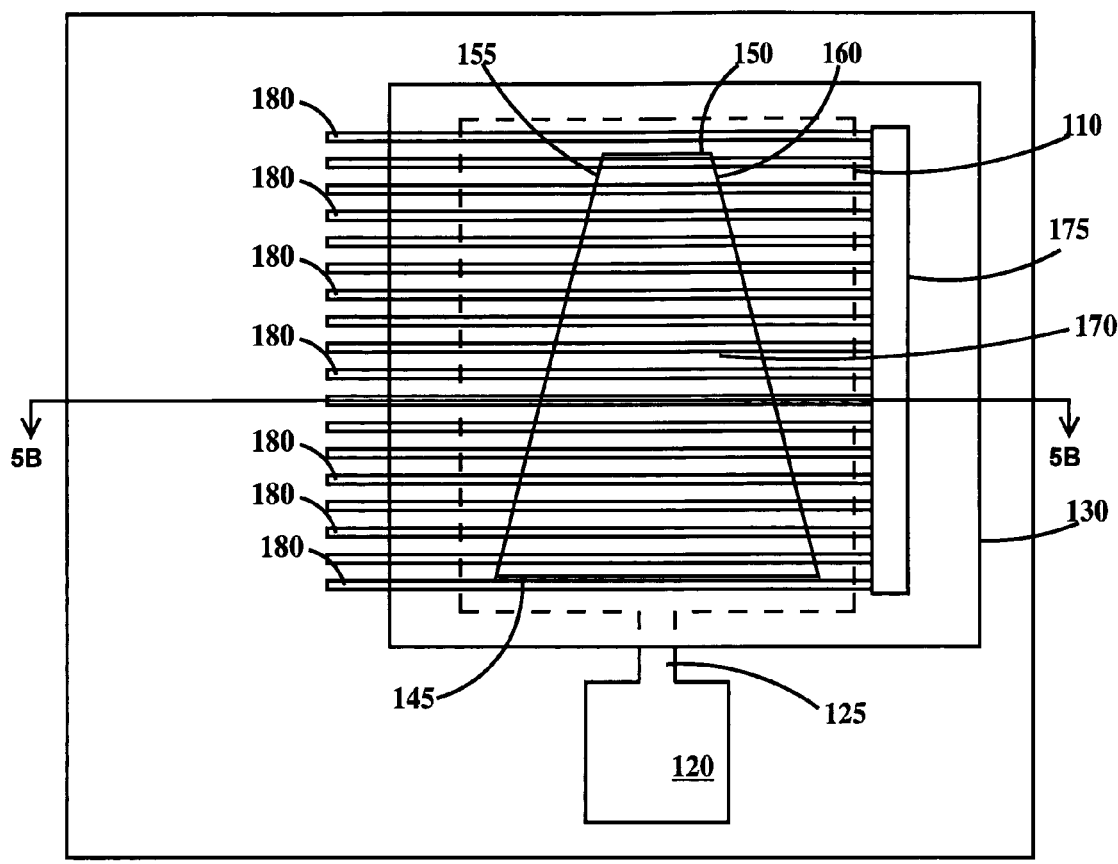
Figure 5B:
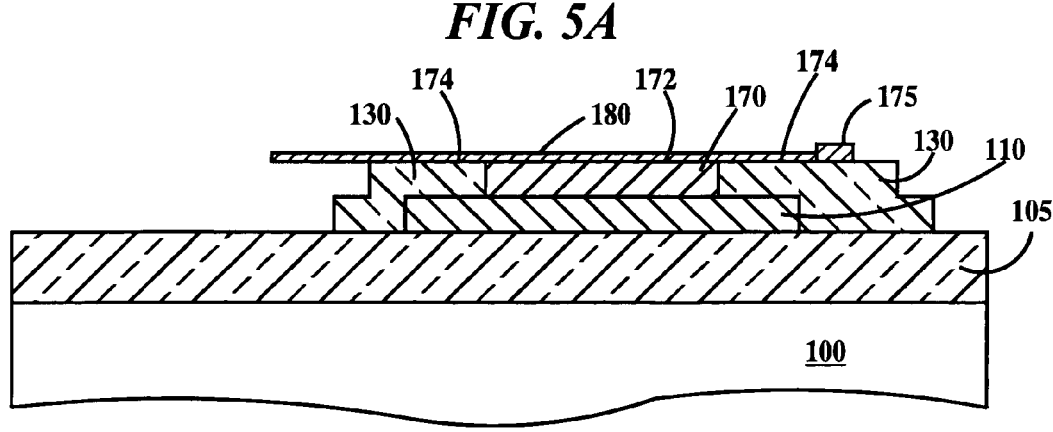

FIG. 5A is a top view, and FIG. 5B is a cross-sectional view through line 5B-5B of FIG. 5A. In FIGS. 5A and 5B CNTs 180 are grown from catalytic bar 175 in a direction parallel to sidewalls 145 and 150 and parallel to and contacting top surface 172 of fill material 170 and top surface 174 of second insulating layer 130. CNTs 180 extend from catalytic bar 175 across sidewall 160, fill material 170 and sidewall 155. The length of CNTs is measured in a direction parallel to sidewalls 145 and 150.

In a first example, CNTs 180 are fabricated by placing substrate 100 in a heated tube in which a CNT sweep gas is passed over alloy of carbon and catalytic metal. The top surface of substrate 100 is positioned to be parallel to the direction of flow of the CNT sweep gas. Substrate 100 is orientated so that catalytic bar 175 is upstream and perpendicular to the gas flow and fill material 170 is downstream of the catalytic bar. Heating catalytic bar 175 with a laser causes CNTs to grow from the catalytic bar and be swept across opening 135. In the first example, catalytic bar 175 comprises carbon mixed with iron, cobalt, nickel or combinations thereof.

In the second example, catalytic bar 175 comprises iron, cobalt, nickel or combinations thereof and after heating catalytic bar 175, the lasers are turned off and a hydrocarbon gas added to the sweep gas. Hydrocarbons that may be used include methane, ethane, propane, butane, olefinic, cyclic or aromatic hydrocarbon, or any other hydrocarbon.

In one example, CNTs 180 are comprised of single-wall carbon nanotubes. In one example, CNTs 180 are comprised of multi-wall carbon nanotubes.

Figure 6A:
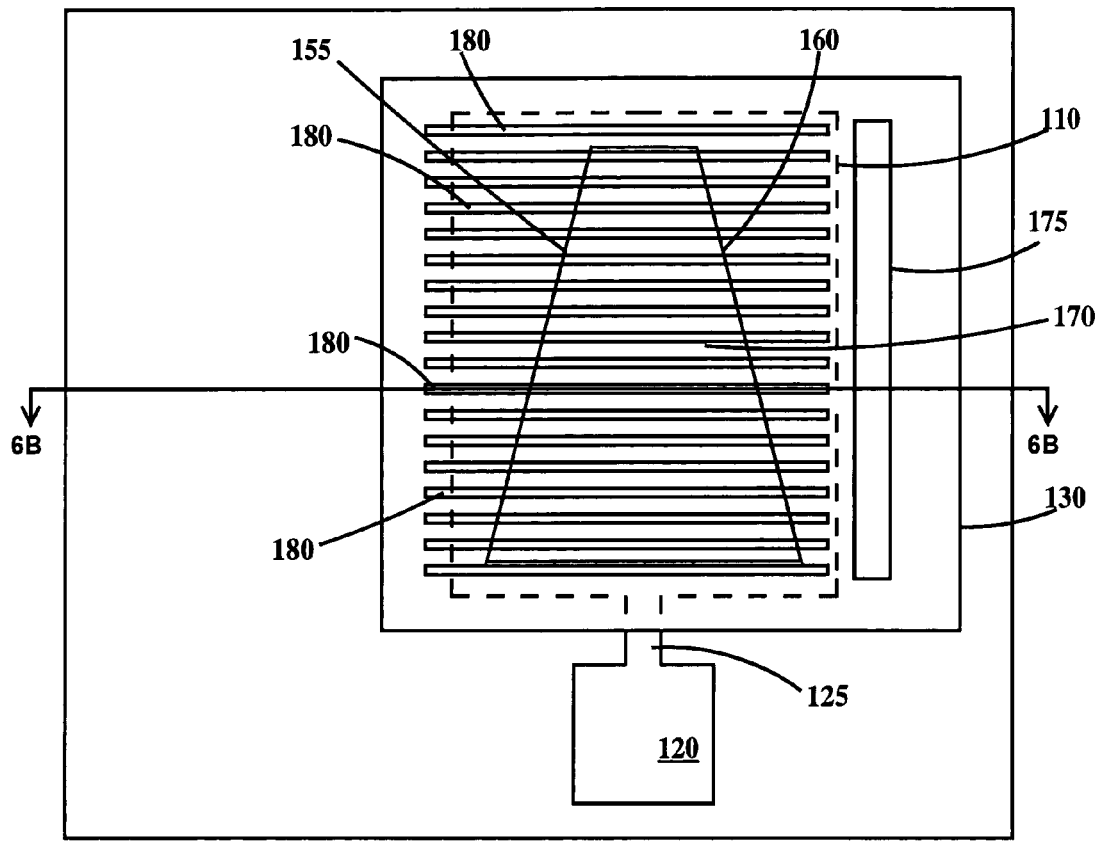
Figure 6B:
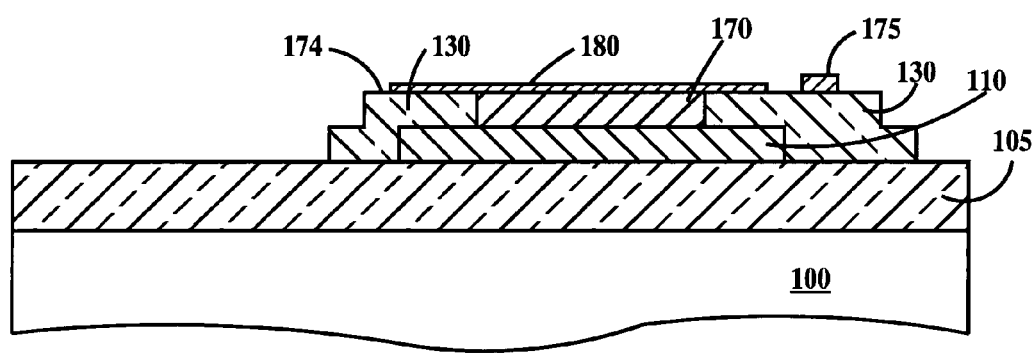

FIG. 6A is a top view, and FIG. 6B is a cross-sectional view through line 6B-6B of FIG. 6A. In FIGS. 6A and 6B, CNTs 180 are "disconnected" from catalytic bar 175 and, if required, photolithographically "trimmed" in length so as not to overhang top surface 174 of second insulating layer 130. While catalytic bar 175 is illustrated as being left in place, the catalytic bar may optionally be removed.

Figure 7A:
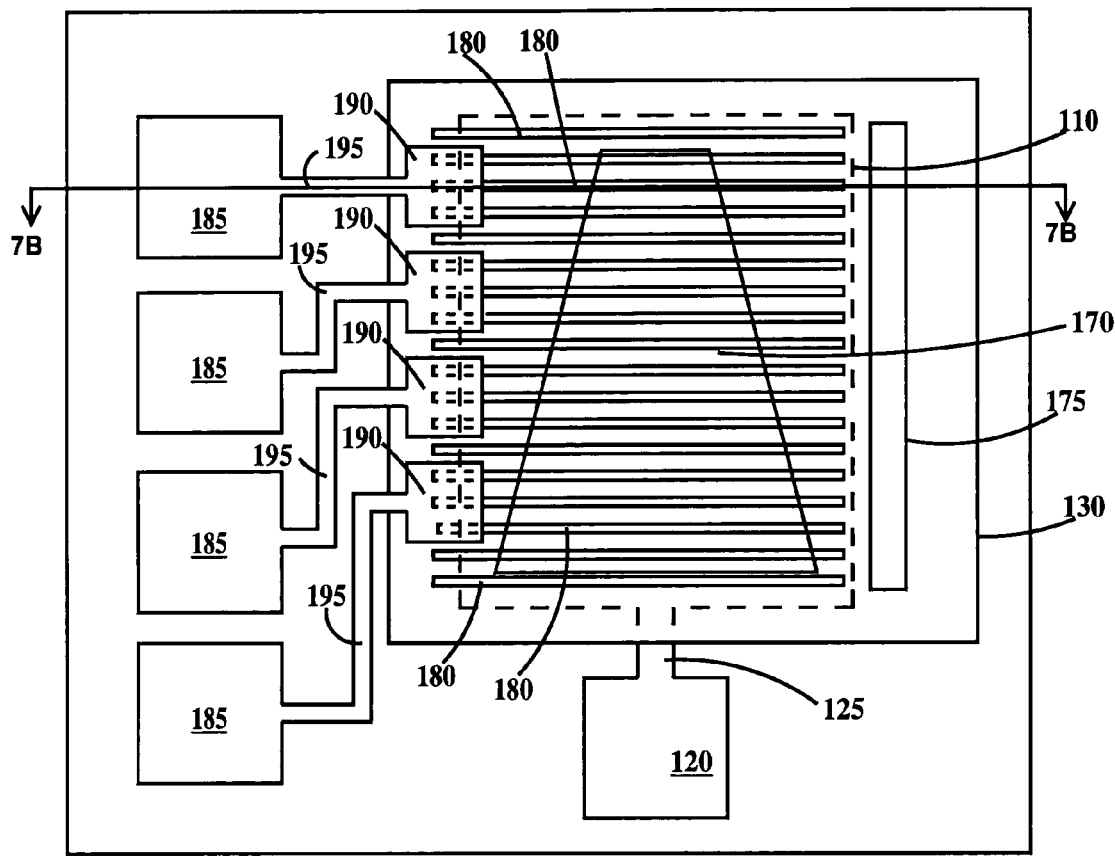
Figure 7B:
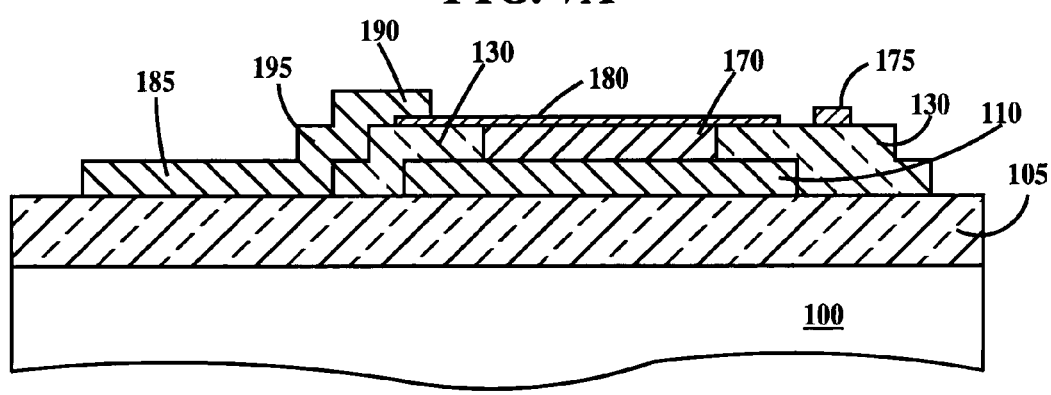

FIG. 7A is a top view, and FIG. 7B is a cross-sectional view through line 7B-7B of FIG. 7A. In FIGS. 7A and 7B a multiplicity of electrically conductive pads 185 are connected to electrically conductive CNT contacts 190 by electrically conductive wires 195. The use of four pads 185 is exemplary and greater or lesser numbers of pads 185 may be employed. Pads 185, CNT contacts 190 and wires 195 may be integrally formed. Each CNT contact 190 contacts a set of one or more different CNTs 180. Not all CNTs 180 need be contacted and adjacent CNT contacts 190 should not contact the same one or more CNTs 180. In one example, pads 185, CNT contacts 190 and wires 195 are comprised of Pt, Au or other metals and combinations thereof.

In one example, pads 185, CNT contacts 190 and wires 195 are formed by depositing a blanket layer of conductive material, forming a photoresist layer on the blanket layer, lithographically defining a pattern of openings in the photoresist layer to expose the blanket layer, subtractively etching the blanket layer and removing the remaining photoresist.

Figure 8A:
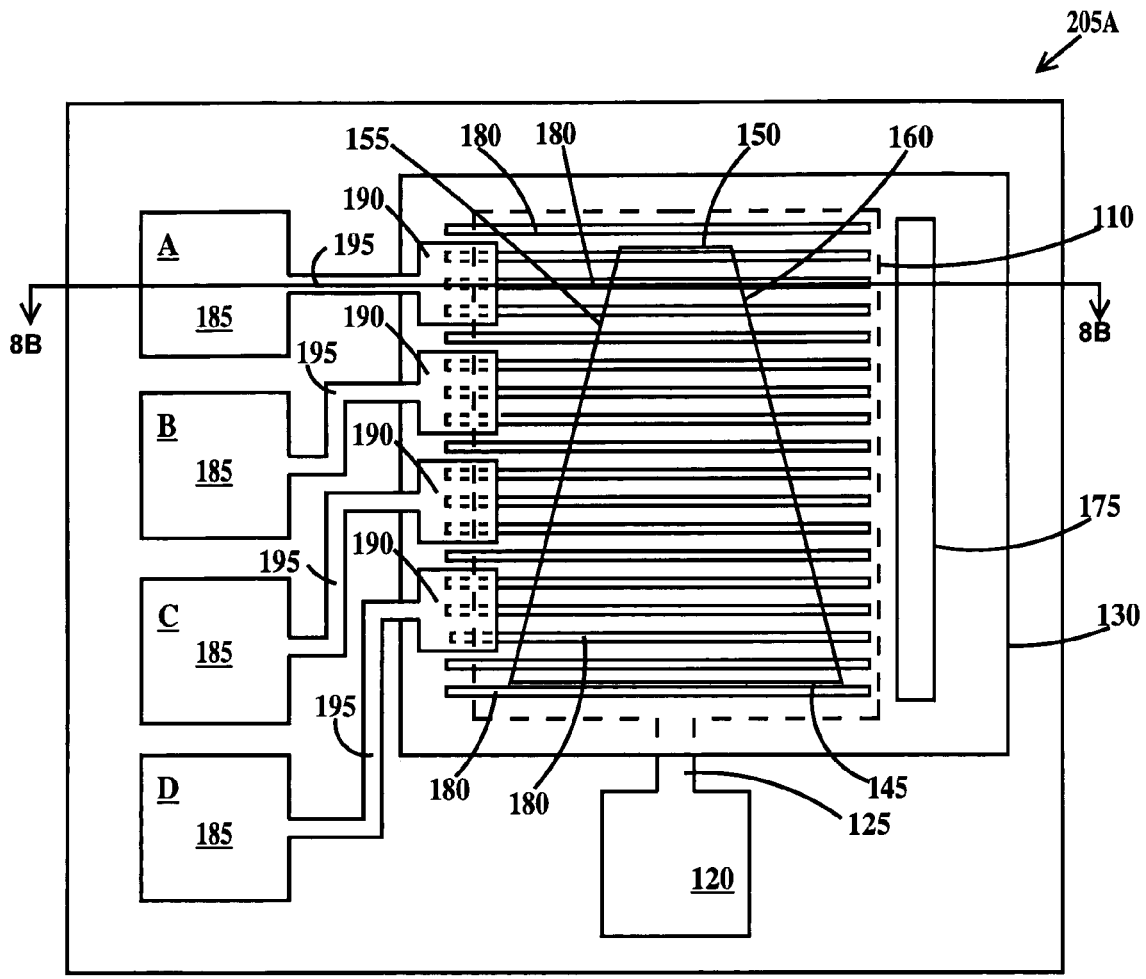
Figure 8B:
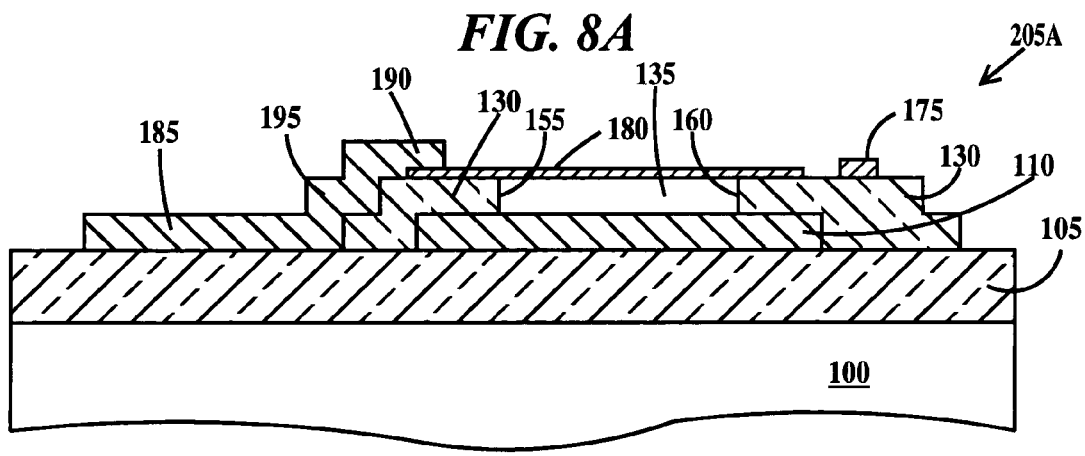

FIG. 8A is a top view, and FIG. 8B is a cross-sectional view through line 8B-8B of FIG. 8A. In FIGS. 8A and 8B fill material 170 (see FIG. 7B) is removed from opening 135 leaving CNTs 180 overhanging opening 135 completing a device 205A. When fill material 170 is germanium, a solution of $H_2O_2$ in water may be used as an etchant. Since the width of opening 135 (measured from sidewall 155 to sidewall 160 in a direction parallel to sidewalls 145 and 150) decreases from sidewall 145 to sidewall 150, the length of overhang of or the distance overhung by individual CNTs 180 varies depending on where they are located relative to sidewalls 145 and 150. Less force is required to deflect CNTs 180 extending across wider portions of opening 135 than to deflect CNTs 180 extending across narrower portions of opening 135. Further discussion is provided infra.

FIGS. 9A through 11A are top views and FIGS. 9B through 11B are corresponding cross-sectional views illustrating the addition of optional inertial weights during the fabrication of the acceleration measurement device according to the first embodiment of the present invention. The steps illustrated in FIGS. 9A through 11A and corresponding FIGS. 9B through 11B are performed after the steps illustrated in FIGS. 1A through 6A and corresponding FIGS. 1B through 6B and replace the steps illustrated in FIGS. 7A, 7B, 8A and 8B.

Figure 9A:
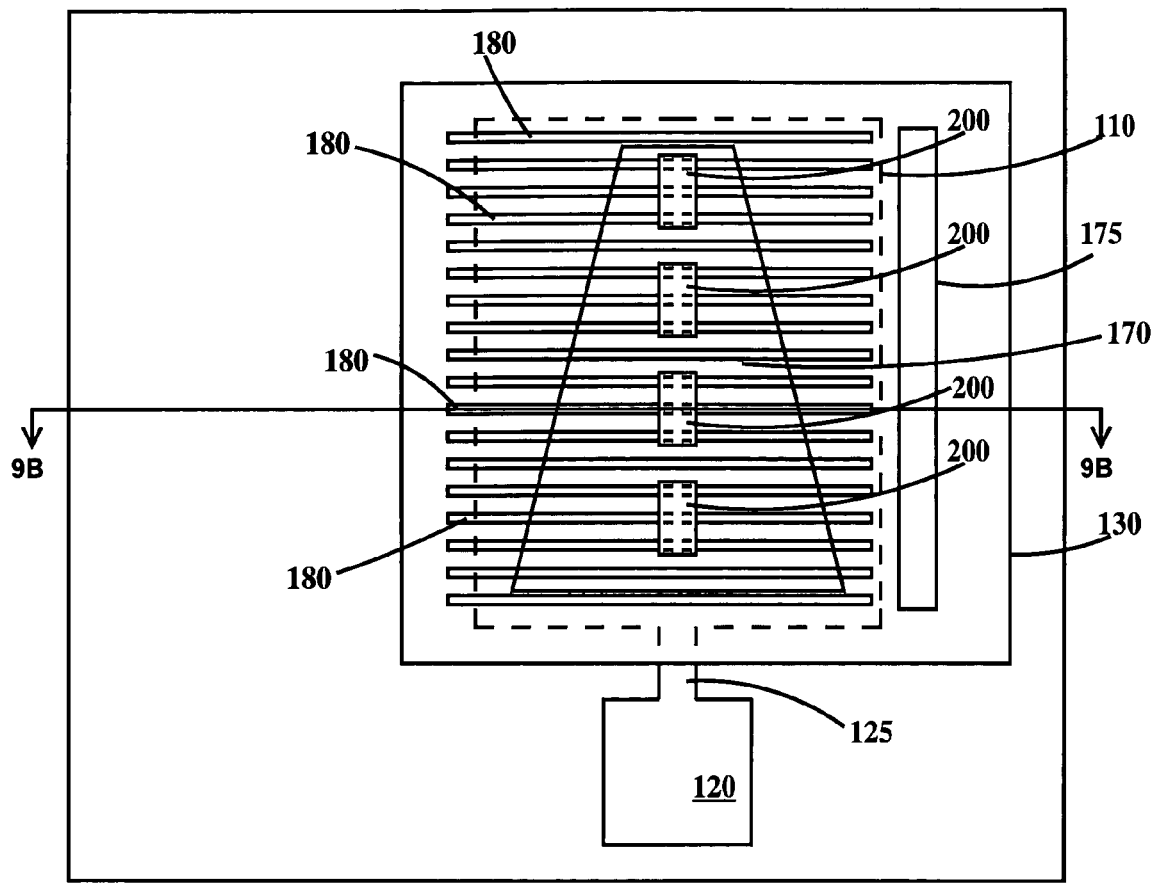
Figure 9B:
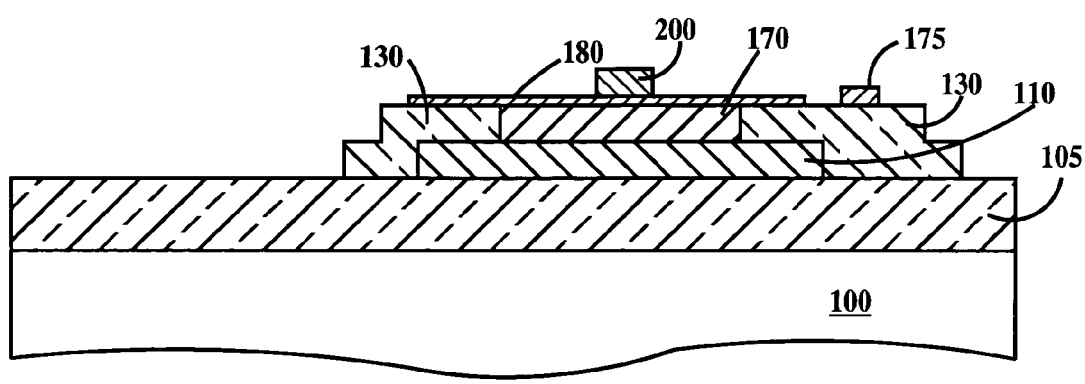

FIG. 9A is a top view, and FIG. 9B is a cross-sectional view through line 9B-9B of FIG. 9A. In FIGS. 9A and 9B a multiplicity of inertial weights 200 are attached to sets of one or more CNTs 180. Each of weights 200 is attached to a single set of one or more different CNTs 180. Not all CNTs 180 need be attached to a weight 200 and adjacent weights 200 should not be attached to the same set of one or more CNTs 180.

In one example, weights 200 are formed using a lift-off process by forming a photoresist layer, lithographically defining openings in the photoresist layer where weights 200 are to be formed, depositing a blanket layer of weight material and then removing the photoresist layer and any weight material on top of the photoresist layer. In one example weights 200 are formed from an electrically conductive material. In one example weights 200 are formed from a semiconductor material. In one example weights 200 are formed from an electrical insulator.

Figure 10A:
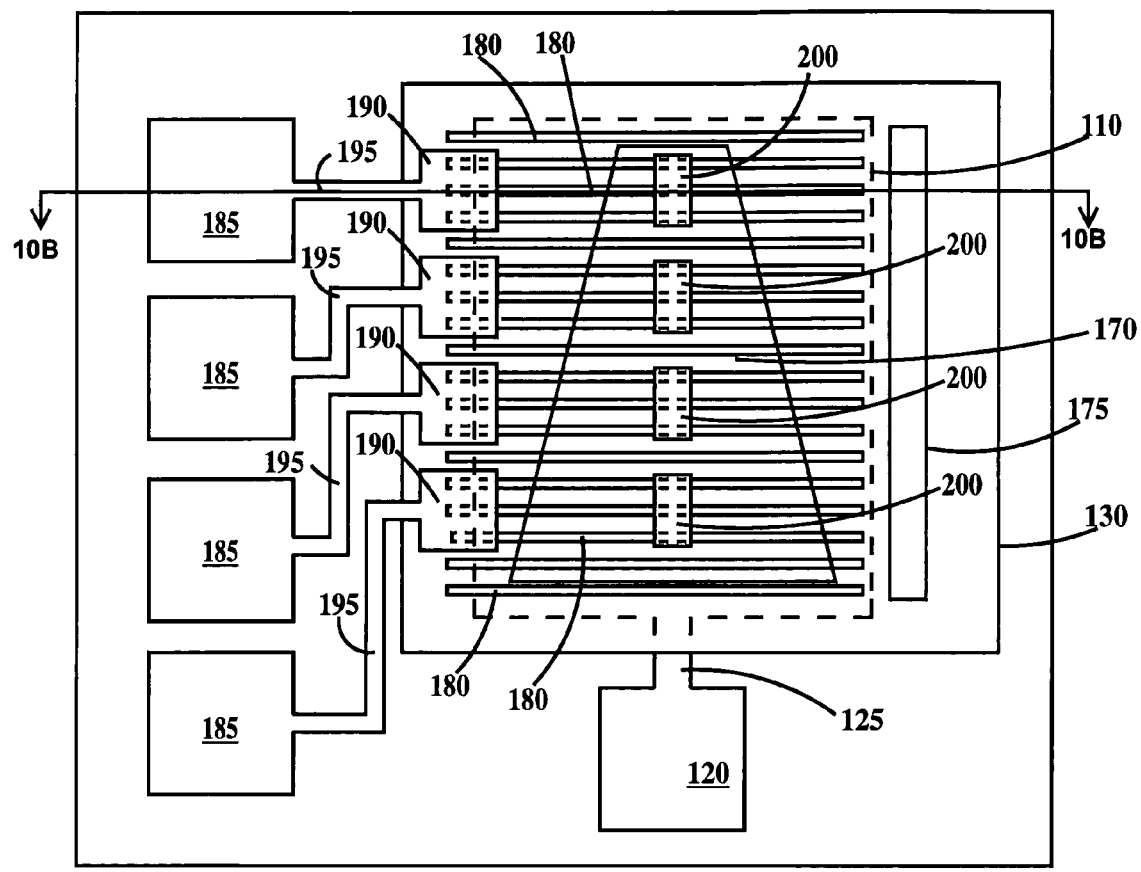
Figure 10B:
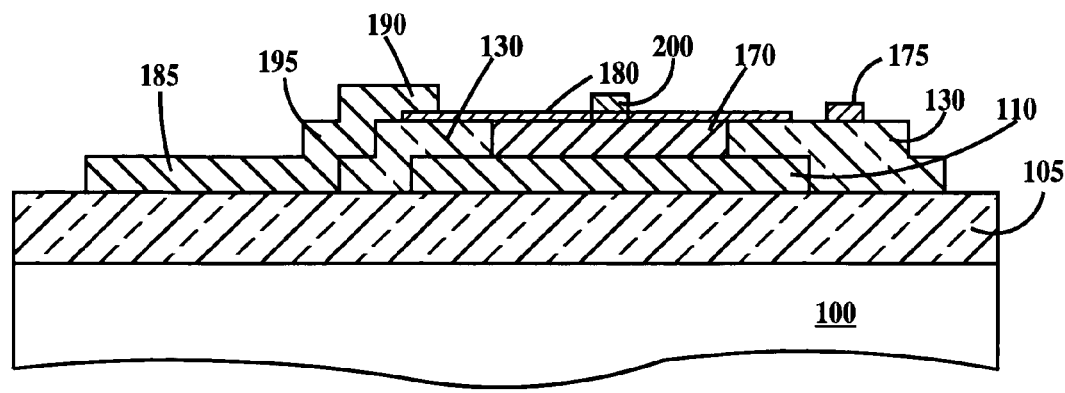

FIG. 10A is a top view, and FIG. 10B is a cross-sectional view through line 10B-10B of FIG. 10A. Except for weights 200, FIGS. 10A and 10B are similar to FIGS. 7A and 7B respectively.

Figure 11A:
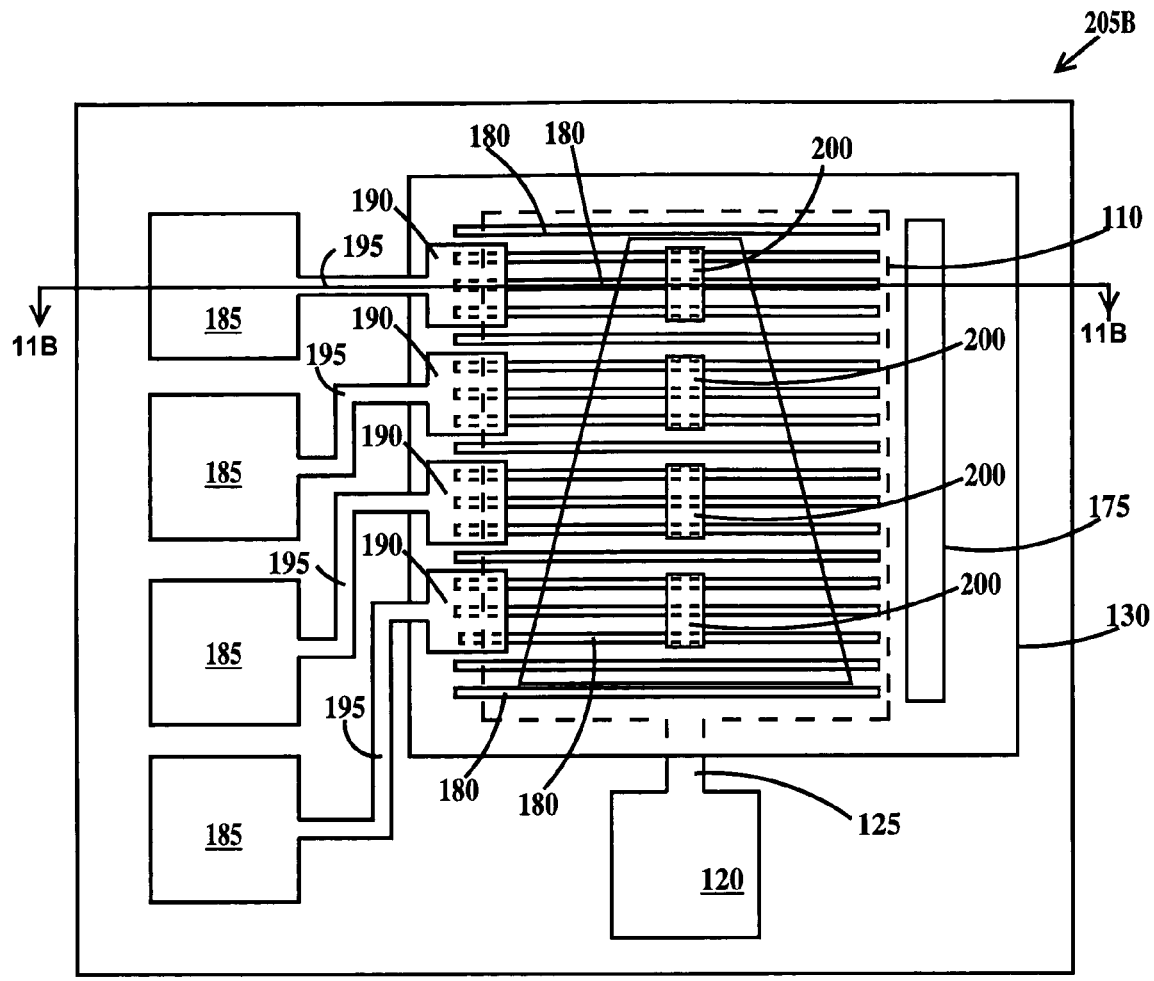
Figure 11B:
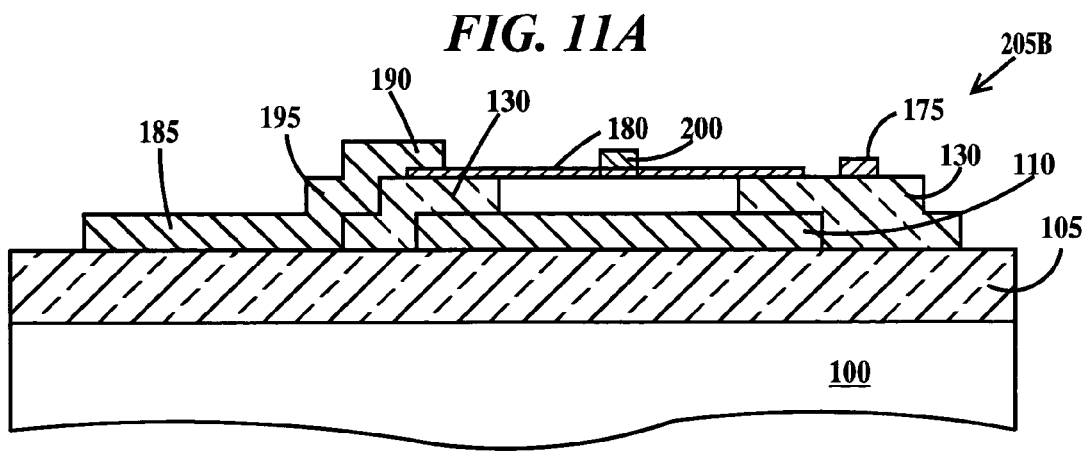

FIG. 11A is a top view, and FIG. 11B is a cross-sectional view through line 11B-1B of FIG. 11A. Except for weights 200, a device 205B of FIGS. 11A and 11B is similar to device 205A of FIGS. 8A and 8B.

FIGS. 12A through 14A are cross-sectional views of the acceleration measurement device according to the first embodiment of the present invention before acceleration, and corresponding FIGS. 12B through 14B are cross-sectional views of the acceleration measurement device according to the first embodiment of the present invention after acceleration.

Figure 12A:
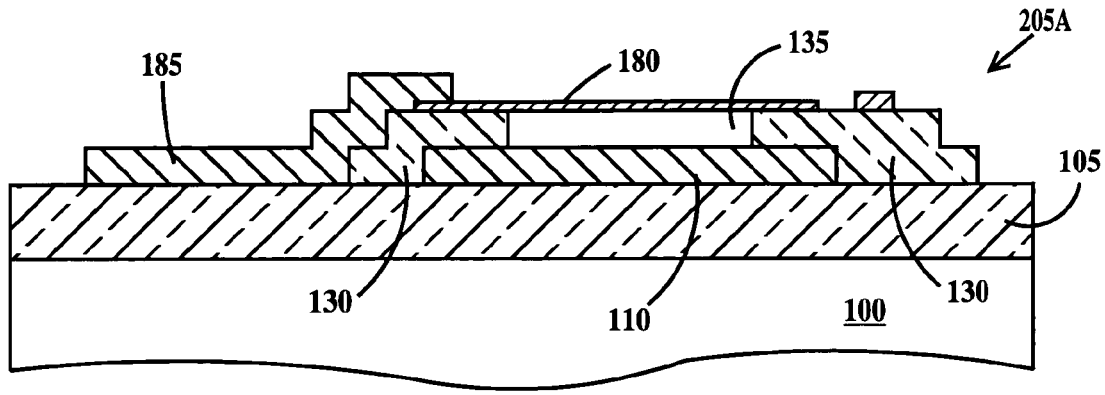
Figure 12B:
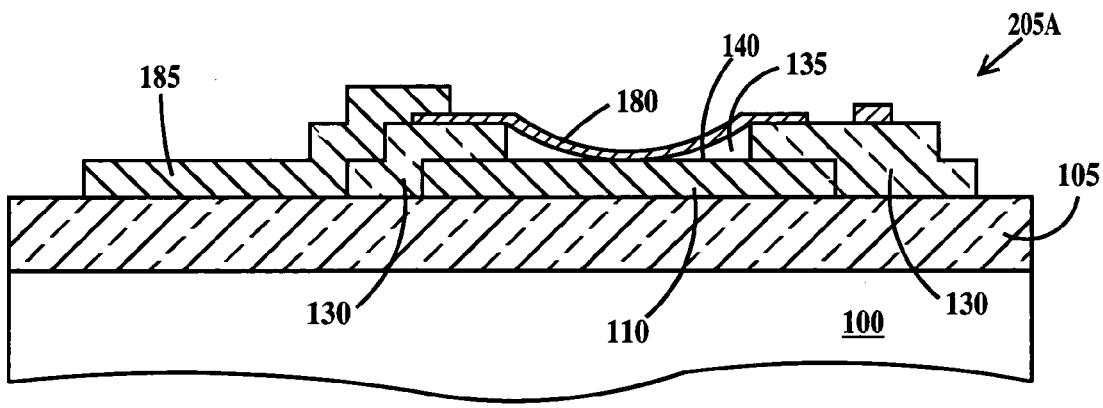

In FIG. 12A, CNTs 180 span opening 135 and there is no electrical connection between conductive layer 110 and pad 185. In FIG. 12B, due to an acceleration event having a significant vector component in a direction perpendicular to top surface 140 of conductive layer 110, CNTs 180 have been bent and are in electrical and physical contact with top surface 140 of conductive layer 110. There are electrical connection between conductive layer 110 and pad 185 through CNTs 180. In FIG. 12B, once CNTs 180 have made contact with top surface 140 of conductive layer 110, CNTs 180 are held in place by van der Waals' forces.

Though not entirely understood, in general, van der Waals' forces are attractive forces between molecules. Bonding in a molecule is caused by orbiting electrons. Any given electrons may be thought of being on one side or the other of a molecule at any one instance of time creating a surplus of negative charge on one side of the molecule and a lack of charge (positive charge) on the opposite side of the molecule, i.e. a dipole is formed. When the dipoles on adjacent molecules are aligned positive pole to negative pole, negative pole to positive pole, there is a weak and transient electrostatic attraction. Since a object is made up of many molecules, there are always a finite number of pairs of molecules having attracting dipoles.

Returning to FIG. 8A, CNTs 180 connected to the pad labeled "A" span a shorter distance across opening 135 than CNTs 180 connected to the pad labeled "B." CNTs 180 connected to the pad labeled "B" span a shorter distance across opening 135 than CNTs 180 connected to the pad labeled "C". CNTs 180 connected to the pad labeled "C" span a shorter distance across opening 135 than CNTs 180 connected to the pad labeled "D". It should be understood that the force exerted on CNTs 180 is proportional to the mass of the CNT and the amount of acceleration. The amount of bending of a transverse member spanning a gap is proportional to, among other factors, the length of the span of the member. Thus, CNTs 180 connected to the pad labeled "D" will contact top surface 140 of conductive layer 110 after undergoing a lower acceleration than that would be required for CNTs 180 connected to the pad labeled "C" to contact top surface 140 of conductive layer 110. The more pads 185 found shorted to pad 120, the higher the acceleration experienced in the detection direction. If the van der Waals' forces causing CNTs 180s to contact and "stick" to top surface 140 is greater than the acceleration forces acting to pull CNTs away from the top surface, then the number of pads 185 shorted to pad 120 has a known relationship (easily calibrated) to the maximum acceleration experienced by the device 205A.

Figure 13A:
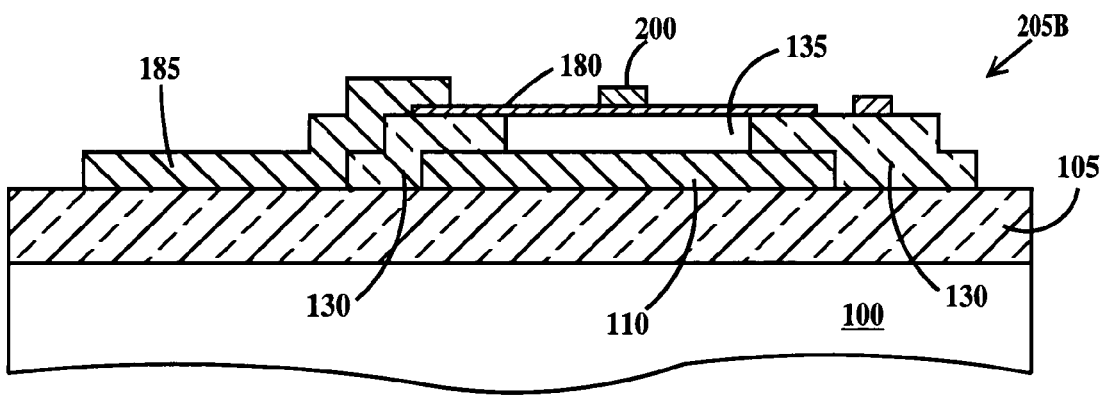
Figure 13B:
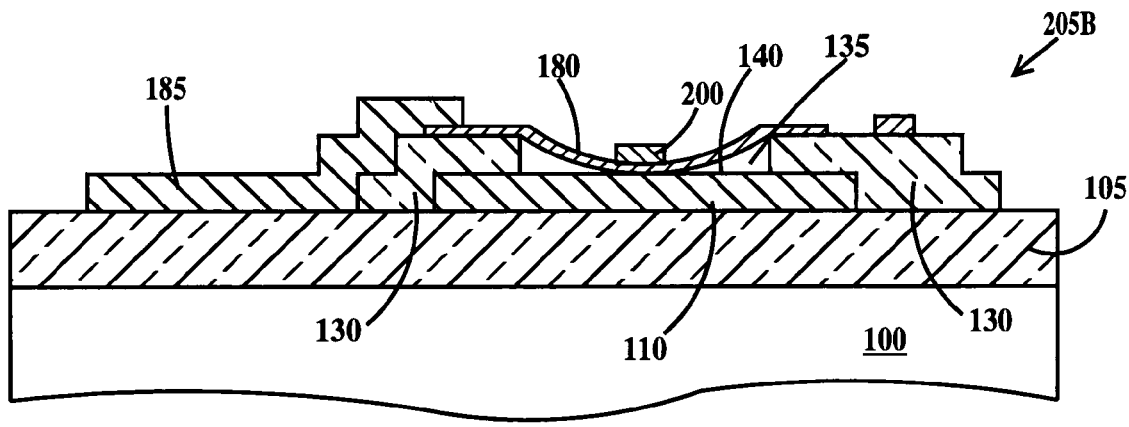

FIGS. 13A and 13B are similar to FIGS. 12A and 12B except for the addition of weight 200 attached to CNTs 180. Weight 200 acts to "magnify" the force due to acceleration exerted on CNTs 180 in order to overcome resistance to bending of the CNTs. In other words, weights 200 increase the bending moment of CNTs 180 by increasing the effective mass of the CNTs. Device 205B of FIG. 11A utilizes this effect.

Figure 14A:
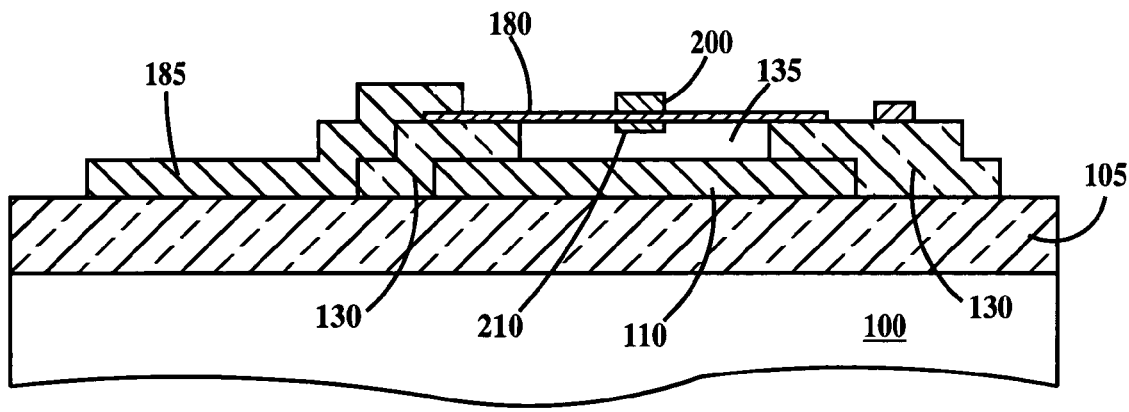
Figure 14B:
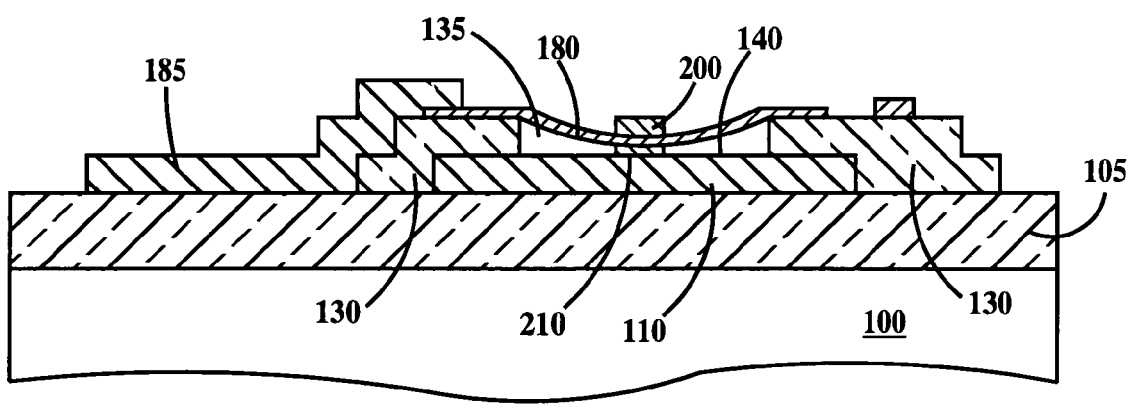

FIGS. 14A and 14B are similar to FIGS. 13A and 13B except for fact that weights 200 attached to CNTs 180 surround the CNTs and extend below the CNTs toward top surface 140. Thus it is that weights 200 that electrically contact top surface 140 of conductive layer 110 and it is weights 200 that are held to conductive layer 110 by van der Waals' forces. The structure illustrated in FIG. 14A may be fabricated by performing a recess etch of filler 170 (see FIG. 7B) between the steps illustrated in FIGS. 7A and 8B and those steps illustrated in FIGS. 9A and 9B and described supra.

Figure 15A:
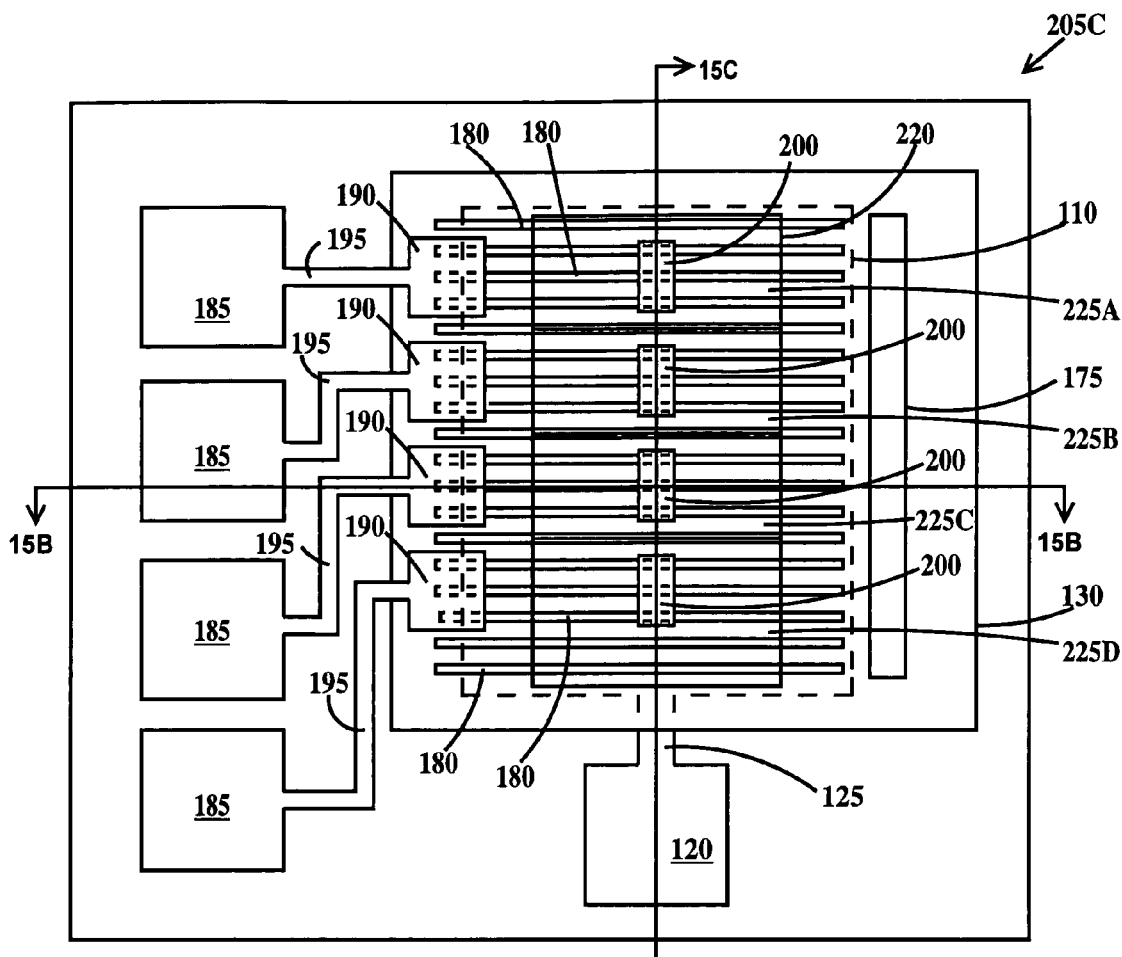
FIG. 15A is a top view.
Figure 15B:
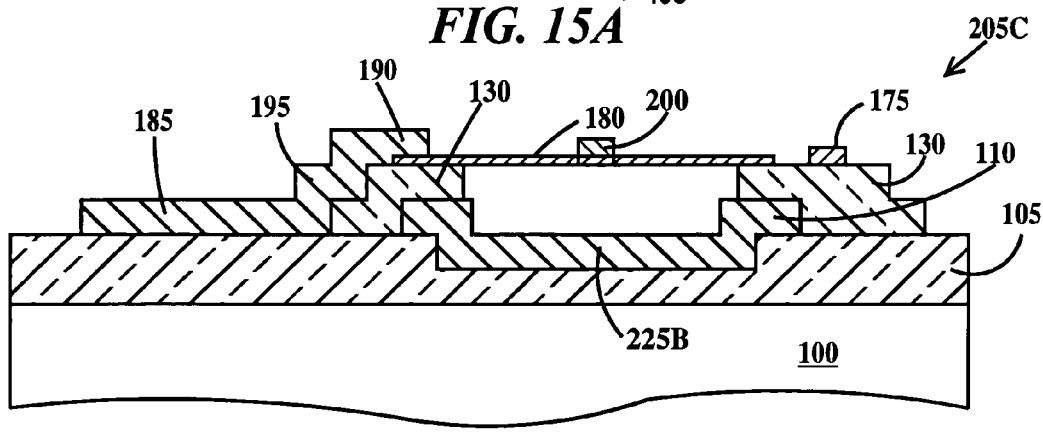
FIG. 15B is a cross-sectional view through line 15B-15B of FIG. 15A
Figure 15C:
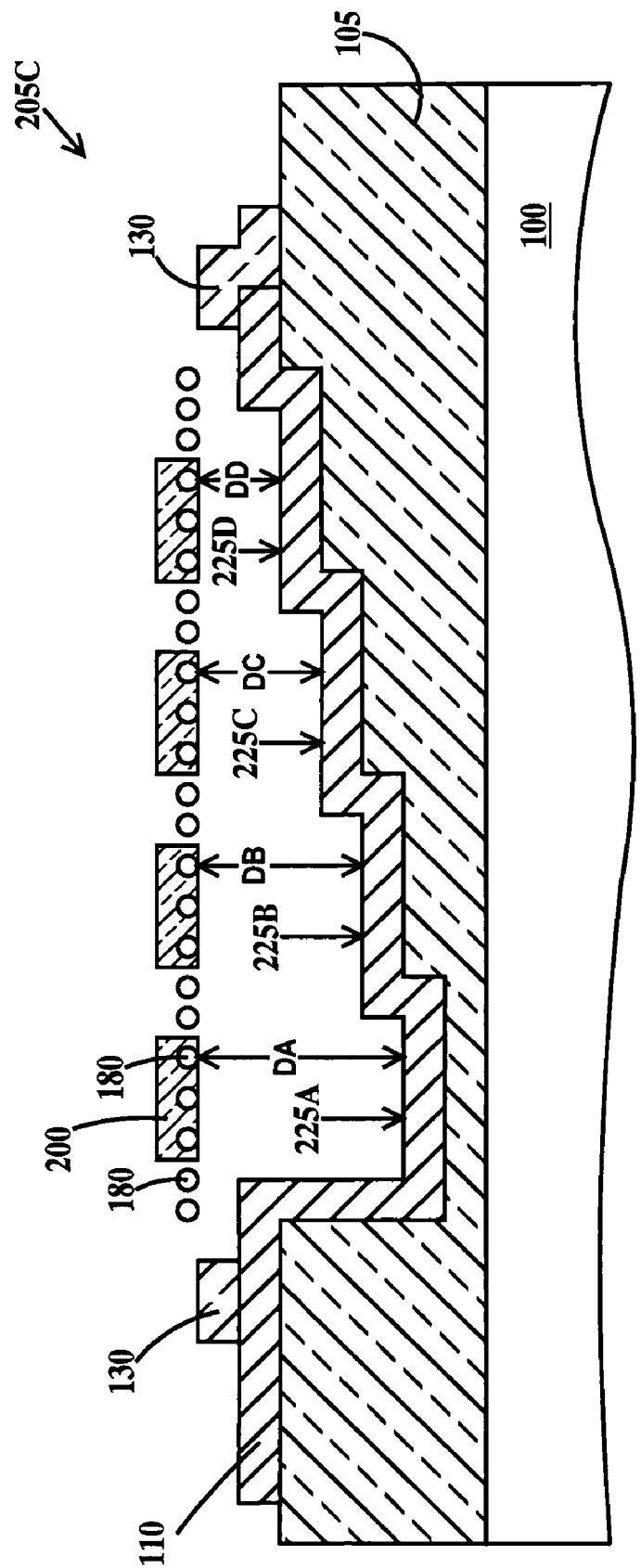
FIG. 15C is a cross-sectional view through line 15C-15C of FIG. 15A of an acceleration/voltage measurement device according to a second embodiment of the present invention.

FIG. 15A is a top view, FIG. 15B is a cross-sectional view through line 15B-15B of FIG. 15A, and FIG. 15C is a cross-sectional view through line 15C-15C of FIG. 15A of an acceleration/voltage measurement device according to a second embodiment of the present invention. A device 205C of FIGS. 15A and 15B is similar to device 205B of FIGS. 11A and 11B except opening 135 of FIGS. 11A and 11B is replaced with a rectangular opening 220 formed over recesses 225A, 225B, 225C and 225D in first insulating layer 105. In FIG. 15C, it can be seen that the distance between CNTs 180 over region 225A and conductive layer 110 is DA. The distance between CNTs 180 over region 225B and conductive layer 110 is DB. The distance between CNTs 180 over region 225C and conductive layer 110 is DC. The distance between CNTs 180 over region 225D and conductive layer 110 is DD. Where DA>DC>DB>DD. Thus, while the spans of CNTs 180 across opening 220 are the same, the amount of deflection required for CNTS to electrically contact and "stick" to conductive layer 110 is different in the regions 225A, 225B, 225C and 225D. Measurement of acceleration in device 205C relies on the fact that the degree of bending of a transverse member is proportion to the force applied to it.

While FIG. 15C illustrates steps etched into first insulating layer 105, alternatively steps may be etched into substrate 100 to form regions 225A, 225B, 225C, and 225D. It should be understood that the structure illustrated in FIGS. 15A, 15B and 15C may be fabricated without weights 200 or using weights that surround the CNTs as depicted in FIG. 14A.

The operating principles of and processes and materials used to form the various structures of the third and fourth embodiment of the present invention described infra are the same as described supra for the first and second embodiment of the present invention unless otherwise noted.

FIGS. 16A through 20A are top views and FIGS. 16B through 20B are corresponding cross-sectional views illustrating fabrication of an acceleration measurement device according to a third embodiment of the present invention. FIG. 16A is a top view, and FIG. 16B is a cross-sectional view through line 16B-16B of FIG. 16A. In FIGS. 16A and 16B three patterned electrically conductive layers 110A, 110B and 110C having respective pad regions 115A, 115B and 115C and respective a pad regions 120A, 120B and 120C are formed on first insulating layer 105.

Figure 17A:
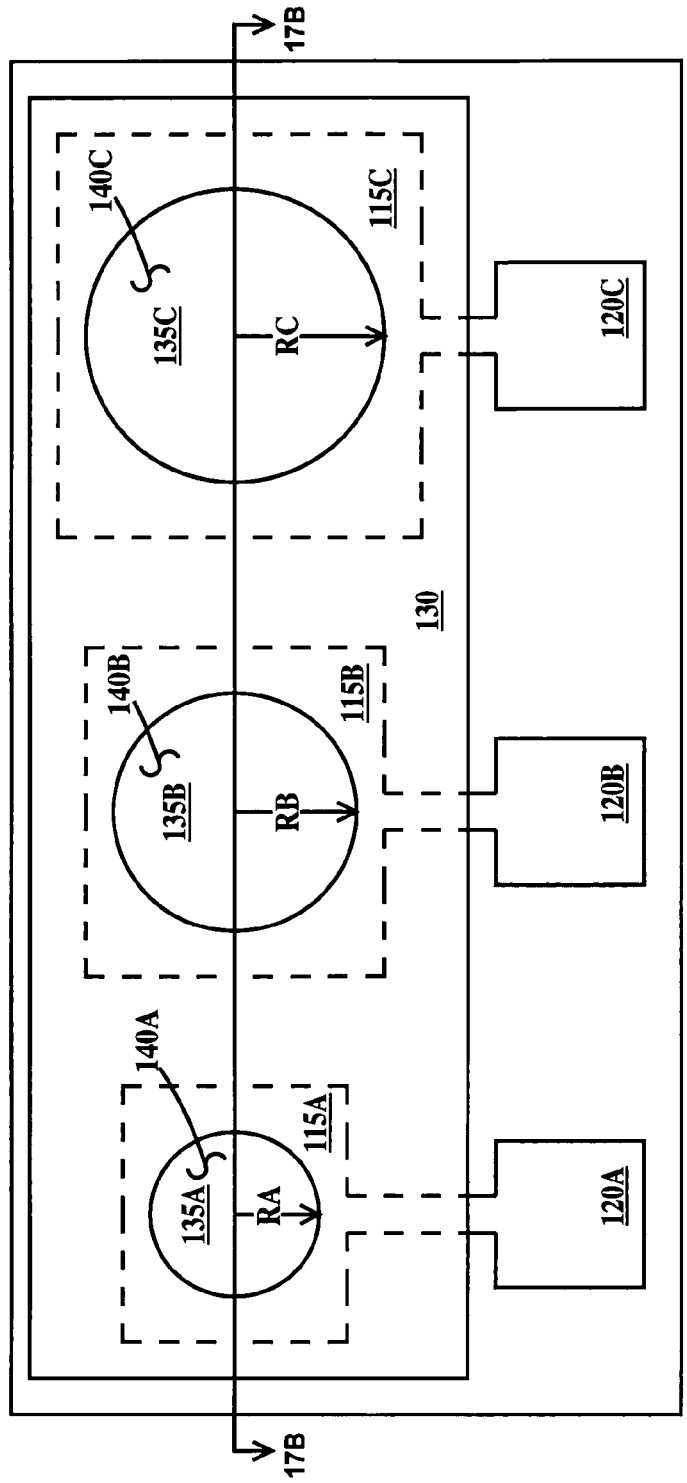
Figure 17B:
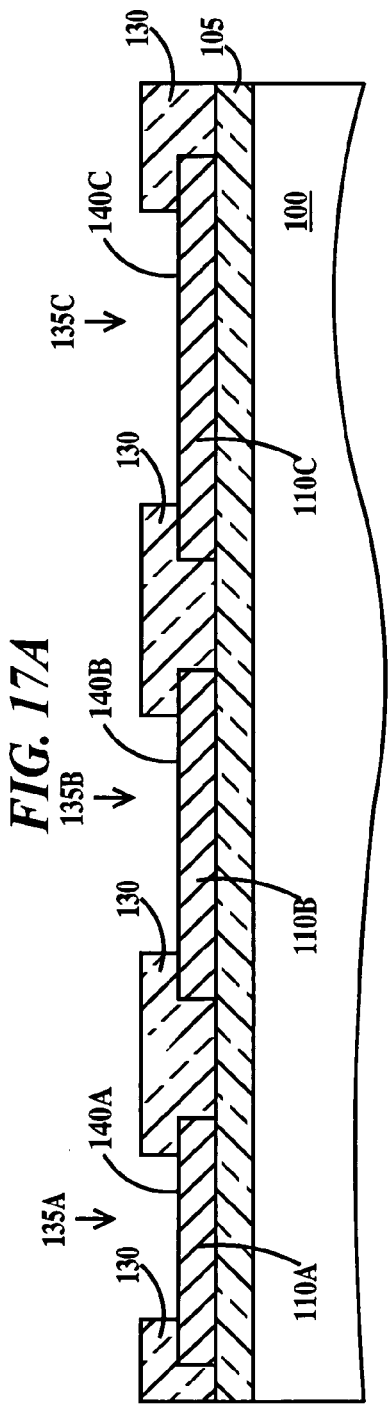

FIG. 17A is a top view, and FIG. 17B is a cross-sectional view through line 17B-17B of FIG. 17A. In FIGS. 17A and 17B a second insulating layer 130 has been formed over plate regions 115A, 115B and 115C and circular openings 135A, 135B and 135C formed in second insulating layer 130 over respective plate regions 115A, 115B and 115C. Top surfaces 140A, 140B and 140C of respective plate regions 115A, 115B and 115C are exposed in respective opening 135A, 135B and 135C. Opening 135A has a diameter RA, opening 135B has a diameter RB and opening 135C has a diameter RC where RC>RB>RA. The use of three plate regions (115A, 115B and 115C) and corresponding openings (13A, 135B and 135C) is exemplary and greater or lesser numbers of pads and openings may be employed.

FIG. 18A is a top view, and FIG. 18B is a cross-sectional view through line 18B-18B of FIG. 18A. In FIGS. 18A and 18B filler 170 is formed in openings 135A, 135B and 135C.

FIG. 19A is a top view, and FIG. 19B is a cross-sectional view through line 19B-19B of FIG. 19A. In FIGS. 19A and 19B a single continuous mat 250 of CNTs is formed over openings 135A, 135B and 135C. In one example, a mat 250 of CNTs is spin-applied from a dispersion of CNTs in a solvent which is then evaporated. In one example, the dispersion is colloidal. In another example the dispersion is mechanical (maintained by agitation). The density of CNTs in mat 250 is controlled so that a sufficient fraction of the area of openings 135A, 135B, and 135C remains uncovered by CNTs so that etchant can penetrate the mat and remove filler 170 as described supra for FIGS. 8A and 8B. In one example, mat 250 is comprised of single-wall carbon nanotubes. In one example, mat 250 is comprised of multi-wall carbon nanotubes.

FIG. 20A is a top view, and FIG. 20B is a cross-sectional view through line 20B-20B of FIG. 20A. In FIGS. 20A and 20B optional weights 200 are formed on mats 250 over the centers of openings 135A, 135B and 135C, an electrically conductive pad 255 is connected to mat 150 and fill material 170 (see FIG. 19B) is removed, completing a device 260A. Weights 200 may surround CNTs making up mat 250 as by recessing fill material 170 (see FIG. 19B) before forming the weights as described supra.

FIG. 21A is a top view and FIG. 21B is a cross-sectional view through line 12B-21B of FIG. 21A of an acceleration/voltage measurement device according to a fourth embodiment of the present invention. In FIGS. 21A and 21B a device 260B is similar to device 260A of FIGS. 20A and 20B except openings 135D, 135E and 135D all have the same diameter and distances D1, D2 and D3 are different with D1>D2>D3. D1 is the distance between mat 250 and an electrically conductive plate 110D. D2 is the distance between mat 250 and an electrically conductive plate 110E. D3 is the distance between mat 250 and an electrically conductive plate 110F. The different distances D1, D2 and D3 were generated by etching steps in first insulating layer 105. Alternatively, the different distances D1, D2 and D3 may be generated by etching steps in substrate 100.

The identical structures of the various embodiments of the present invention, may also be used as voltage measurement devices as well as acceleration measurement devices. Returning to FIG. 8A, for example, applying a same voltage differential across pads 185 and pad 120 will cause CNTs 180 to bend toward conductive layer 110. A lesser voltage differential will be required to bend CNTs 180 attached to pad D sufficiently to cause the CNTs to touch and then attach to conductive layer 110 by van der Waals forces than will be required to bend and attach CNTs 180 to, for example, pad B. Once the voltage is removed, any CNTs attached to conductive layer 110 will remain attached and by probing between the different pads 185 and 120, a maximum voltage experienced by the device can be determined.

Figure 22A:
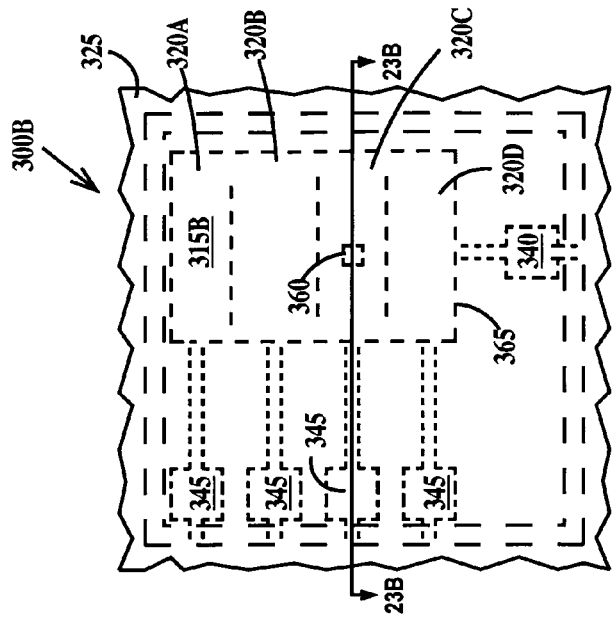
FIG. 22A is a top view and FIG. 22B is a cross-sectional view through line 22B-22B of FIG. 22A of a voltage measurement device according to certain embodiments of the present invention.
Figure 22B:
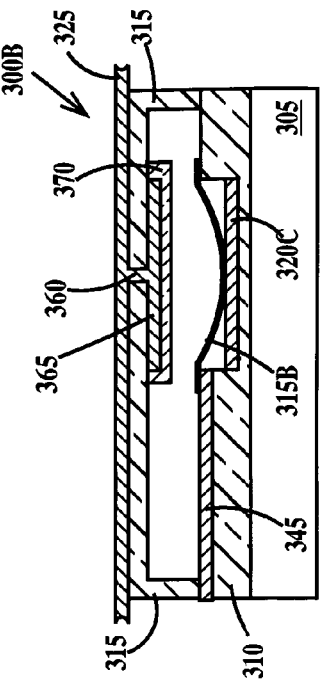

FIG. 22A is a top view and FIG. 22B is a cross-sectional view through line 22B-22B of FIG. 22A of a voltage measurement device according to certain embodiments of the present invention. In FIGS. 22A and 22B, a device 300A includes a substrate 305 on which an insulating layer 310 has been formed and an insulating lid 315 attached to insulating layer 310. A CNT array 315A over a conductive plate 320 according to the first and second embodiments of the present invention has been formed on insulation layer 310. An electrically conductive antenna 325 is positioned on top of lid 315 and electrically coupled via contact 330 to a pad 340. Pad 340 is electrically connected to conductive plate 320. Electrically conductive pads 345 are connected to different sets of CNTs of CNT array 315A.

Device 300A may be placed in an electrically charging environment such as a plasma etch or plasma deposition chamber in operation while pad 340 and pads 345 are electrically floating. Induced voltage on antenna 325 will cause some sets of CNTs to be attracted to and then van der Waals forces cause the CNTs to stick to conductive plate 320. Afterwards, device 300A is taken out of the charging environment and pad 340 is individually probed to different pads 345 in order to determine the maximum voltage experienced between CNTs and the conductive plate under the CNTs.

Figure 23A:
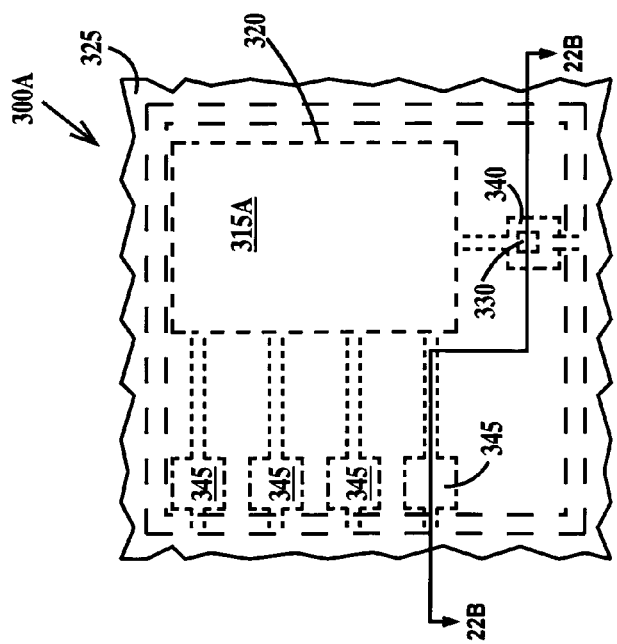
FIG. 23A is a top view and FIG. 23B is a cross-sectional view through line 23B-23B of FIG. 23A of a voltage measurement device according to certain embodiments of the present invention.
Figure 23B:
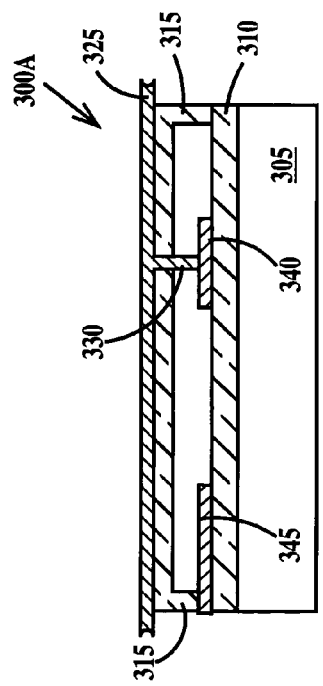

FIG. 23A is a top view and FIG. 23B is a cross-sectional view through line 23B-23B of FIG. 23A of a voltage measurement device according to certain embodiments of the present invention. In FIGS. 23A and 23B, a device 300B includes a substrate 305 on which an insulating layer 310 has been formed and a insulating lid 315 attached to insulating layer 310. A CNT mat 315B over a set of conductive plates 320A, 320B, 320C and 320D according to the third and fourth embodiments of the present invention have been formed on insulation layer 310. An electrically conductive antenna 325 is positioned on top of lid 315. Pad 340 is electrically connected to CNT mat 315B. Electrically conductive pads 345 are connected to different conductive plates 320A, 320B, 320C and 320D. Antenna 325 is electrically connected via electrically conductive contact 360 to an electrode 365 positioned above CNT mat 315B. Electrode 365 is covered by and insulating layer 370 so that CNT mat 315B does not short to electrode 365 when portions of the CNT mat are attracted to the electrode as described infra.

Device 300B is first pre-charged so as to attract portions of CNT mat 315B to conductive plates 320A, 320B, 320C and 320D and attach by van der Walls forces. Then device 300B may be placed in an electrically charging environment such as a plasma etch or plasma deposition chamber in operation while pad 340 and pads 345 are grounded or are electrically floating. Induced voltage on antenna 325 will cause certain CNTs to be attracted to electrode 365 and break the van der Waals bonds holding the CNTs to conductive plate 320. Afterwards, device 300B is taken out of the charging environment and pad 340 is individually probed to different pads 345 in order to determine the maximum voltage experienced between CNT mat 315B and conductive plates 320A, 320B, 320C and 320D.

Thus the various embodiments of the present invention provide compact and passive maximum acceleration and voltage recording devices and methods of fabricating passive maximum acceleration and voltage recording devices. For example, the varying widths of openings of the first embodiment may be combined with the varying depth of openings of the second embodiment. Likewise, the varying widths of openings of the third embodiment may be combined with the varying depth of openings of the fourth embodiment. And while the third and fourth embodiments of the present invention have been illustrated with circular openings in the second insulating layer, openings of other geometric shapes such as triangles, squares, rectangles, trapezoids and polygons may be used. Additionally, carbon nanotubes may be replaced with electrically conductive nanotubes or filaments comprising materials other than carbon or in combination with carbon.

The description of the embodiments of the present invention is given above for the understanding of the present invention. It will be understood that the invention is not limited to the particular embodiments described herein, but is capable of various modifications, rearrangements and substitutions as will now become apparent to those skilled in the art without departing from the scope of the invention. Therefore, it is intended that the following claims cover all such modifications and changes as fall within the true spirit and scope of the invention.

What is claimed is:

1. A method comprising:
    forming an electrically conductive plate on a top surface of a first insulating layer;
    forming a second insulating layer on a top surface of said conductive plate;
    forming an opening in said second insulating layer, said top surface of said plate exposed in said opening;
    filling said opening with a fill material;
    forming a catalytic bar adjacent to a sidewall of said opening;
    growing two or more sets of one or more electrically conductive carbon nanotubes from said catalytic bar, said carbon nanotubes extending across said fill material, distal first and second end regions of said carbon nanotubes in contact with said second insulating layer;
    severing said carbon nanotubes from said catalytic bar and removing said fill material after which middle regions of said carbon nanotubes are suspended across said opening, nanotubes in different sets of nanotubes not in electrical contact with each other; and
    forming one or more electrically conductive contacts, each said one or more contacts in electrical contact with first end regions of nanotubes of different sets of nanotubes.

2. The method of claim 1, further including, forming inertial weights attached to said middle regions of said carbon nanotubes of respective sets of said two or more sets of nanotubes.

3. The method of claim 1,
    wherein a depth of said opening in a direction perpendicular to said top surface of said conductive plate is different under each of said two or more sets of nanotubes; or
    wherein both a width of said opening in said direction parallel to a longitudinal axes of said carbon nanotubes and said depth of said opening in a direction perpendicular to said top surface of said conductive plate is different under each of said two or more sets of nanotubes.

4. The method of claim 1, wherein regions of said carbon nanotubes suspended over said opening are deflectable by an acceleration force having a vector component applied in a direction perpendicular to said top surface of said conductive plate such that any of one or more of said two or more sets of nanotubes brought into physical contact with said top surface of said conductive plate will remain attached to said top surface of said conductive plate by van der Waals forces after removal of said accelerating force.

5. The method of claim 1, wherein said carbon nanotubes are single wall or multi-wall carbon nanotubes.

6. The method of claim 1, wherein a width of said opening in a direction parallel to a longitudinal axes of said carbon nanotubes is different under each of said two or more sets of said nanotubes.

7. The method of claim 1, wherein said opening has parallel first and second opposite sides, said first side shorter than said second side and opposite third and fourth sides connecting said first and second sides.

8. The method of claim 1, further including forming a contact to said conductive plate.

9. The method of claim 1, further including, removing said catalytic bar.

10. The method of claim 2, wherein said inertial weights extend below said nanotubes toward said conductive plate and are formed of an electrically conductive material.

* * * * *

UNITED STATES PATENT AND TRADEMARK OFFICE
CERTIFICATE OF CORRECTION

PATENT NO. : 7,629,192 B2
APPLICATION NO. : 11/161181
DATED : December 8, 2009
INVENTOR(S) : Furukawa et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 982 days.

Signed and Sealed this

Second Day of November, 2010

David J. Kappos
*Director of the United States Patent and Trademark Office*